(12) United States Patent
Iwanaga

(10) Patent No.: US 6,234,515 B1
(45) Date of Patent: May 22, 2001

(54) PILLAR UNIT

(75) Inventor: Kentaro Iwanaga, Aichi (JP)

(73) Assignee: Inoac Corporation, Aichi (JP)

( * ) Notice: Subject to any disclaimer, the term of this patent is extended or adjusted under 35 U.S.C. 154(b) by 0 days.

(21) Appl. No.: 09/420,837

(22) Filed: Oct. 19, 1999

(30) Foreign Application Priority Data

Oct. 30, 1998 (JP) ................................. 10-310826
May 7, 1999 (JP) ................................. 11-127326

(51) Int. Cl.$^7$ .................................................. B60R 21/16
(52) U.S. Cl. ...................... 280/728.2; 280/730.2
(58) Field of Search ............... 280/728.1, 728.2, 280/730.1, 730.2

(56) References Cited

U.S. PATENT DOCUMENTS 6,082,761 * 7/2000 Kato et al. ................... 280/730.2
6,102,435 * 8/2000 Wallner et al. ............... 280/730.2

* cited by examiner

Primary Examiner—Paul N. Dickson
Assistant Examiner—Faye M. Fleming
(74) Attorney, Agent, or Firm—Sughrue, Mion, Zinn, Macpeak & Seas, PLLC

(57) ABSTRACT

A structure for joining a pillar garnish including an air bag, incorporating: a pillar garnish 10 made of synthetic resin and having a reverse side from which a seat portion 17 projects into which a head 31 of a rod-shape fixing metal member 31 is embedded; and an engaging portion 33 formed at another end of the rod-shape fixing metal member and inserted and engaged into the inside portion of an engaging hole 25 of a pillar portion of the car body, wherein the head 31 of the rod-shape fixing metal member 30 is covered with a coating layer 40 made of synthetic resin to make the thickness of the pillar garnish surrounded by the side surface of the seat portion to be uniform, the resin for constituting the coating layer contains polyolefine by 40 wt % or greater and having the relationship between peak area S1 which indicates a heating value required to melt polypropylene and detected by differential scanning calorie measurement (DSC) and peak area S2 indicating a heating value required to melt a component which is melted at a temperature lower than the temperature at which polypropylene is melted, the relationship satisfying $S2/S1<\frac{1}{2}$.

11 Claims, 16 Drawing Sheets

FIG. 1
FIG. 2
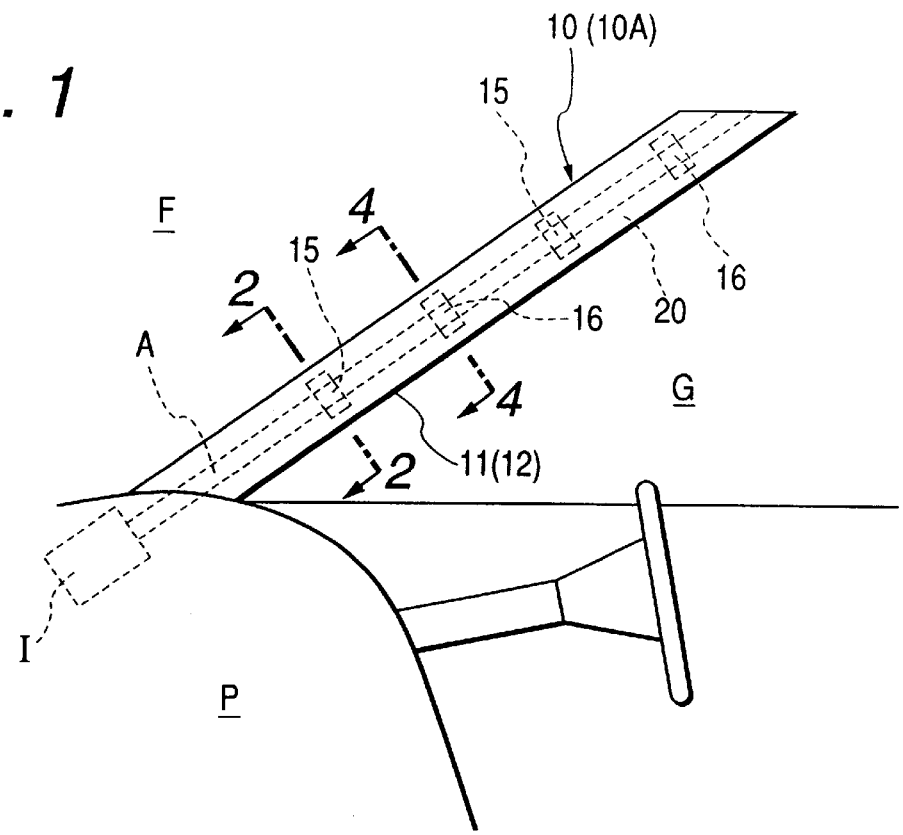
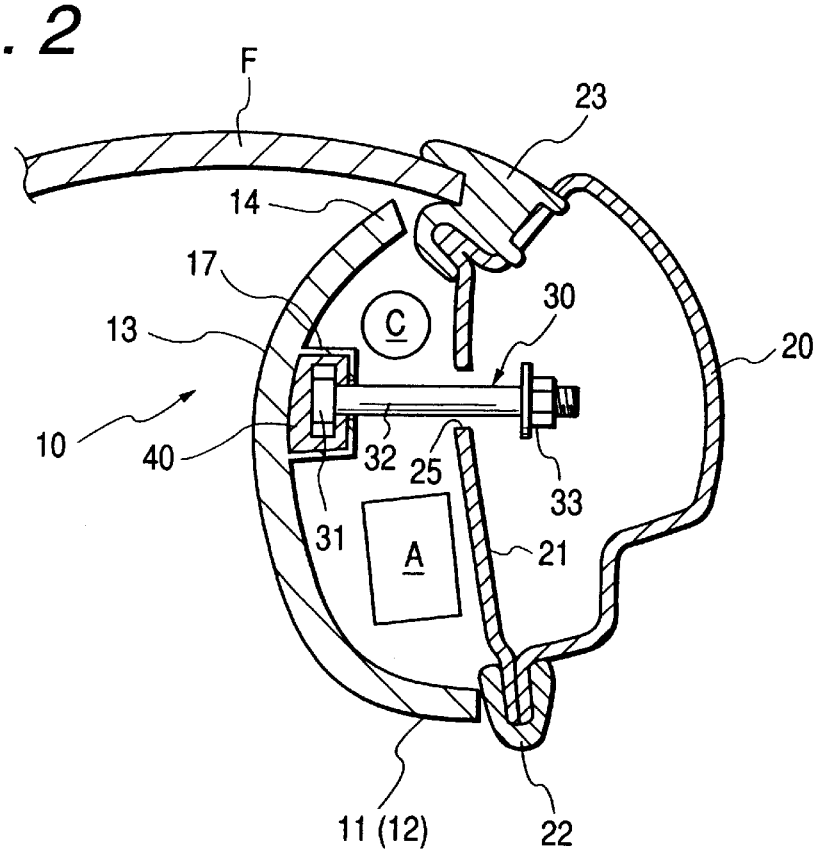

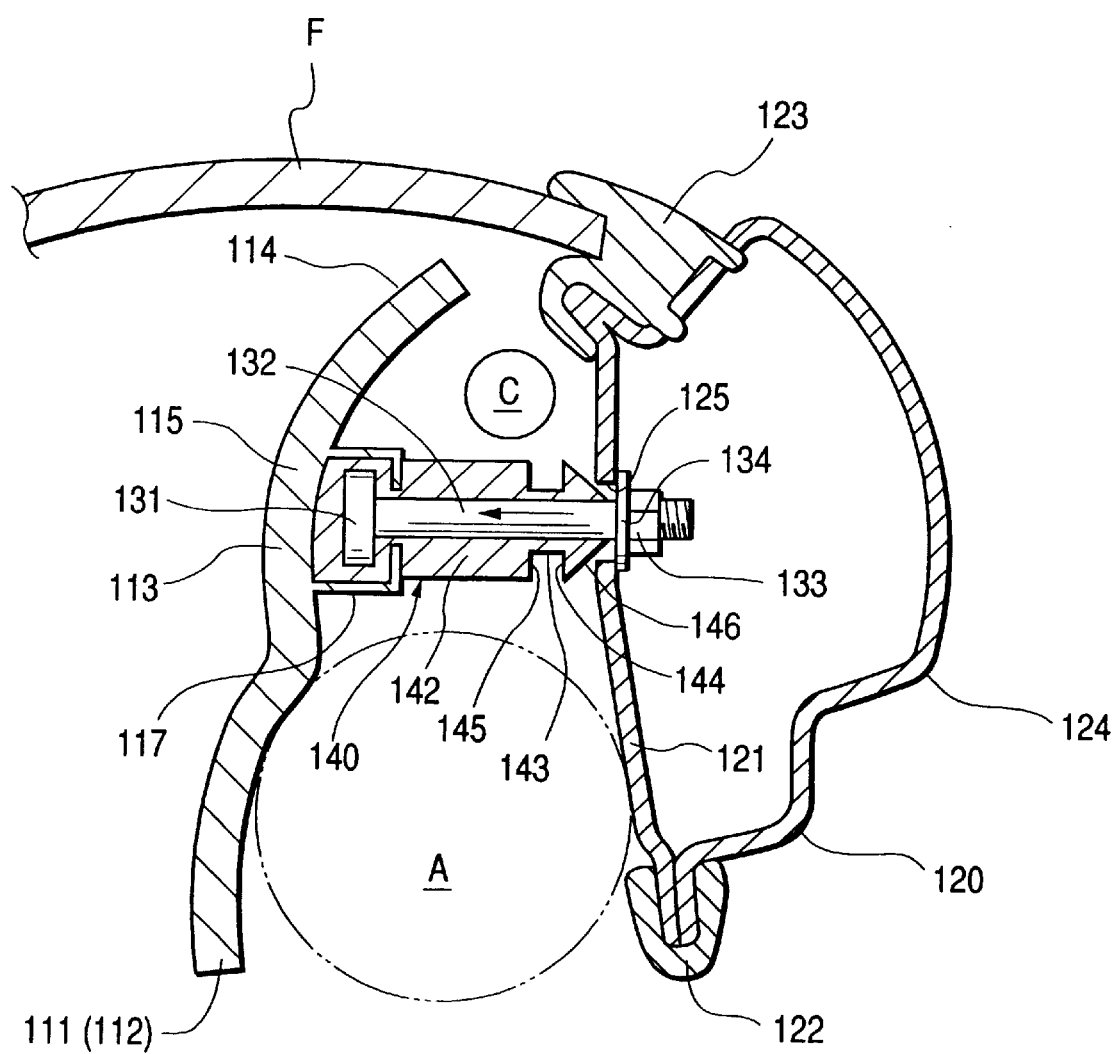

PILLAR UNIT

BACKGROUND OF THE INVENTION

1. Field of the Invention

The present invention relates to a pillar garnish which is joined to a front pillar portion of an automobile, and more particularly to a structure for joining a pillar garnish including an air bag.

2. Description of the Related Art

Hitherto, passengers of an automobile are safely protected from a shock caused from collision by an air bag apparatus provided for the front portion and side portions in the cabin. To prevent collision of the head of a passenger with a side glass or the like in the event of a shock exerted from the side surface of an automobile, a pillar garnish 60 including an air bag A on the reverse side thereof is, in recent years, joined to a pillar portion 75 of the front portion of the car body, as shown in FIG. 19. The pillar garnish 60 including the air bag is structured such that an inflater I disposed adjacent to an instrument panel P generates gas with which the air bag A is expanded as shown in FIG. 20. Thus, the air bag A is expanded, thereby causing the pillar garnish 60 to be pushed and bent toward the inside portion of a cabin. Thus, a gap for permitting the air bag A to expand is formed between the pillar portion 75 of the car body and the pillar garnish 60. The air bag A passes through the gap so that the air bag A is developed between a head T of a passenger and a window glass G as indicated with a chain line Bo shown in FIG. 19. As a result, the head T of a passenger can be prevented.

The pillar garnish 60 including the air bag is structured such that great pressure is applied to the pillar garnish 60 in a direction toward the inside portion of the cabin when the air bag A is expanded and developed. Therefore, the pillar garnish 60 must be joined in such a manner that separation of the pillar garnish 60 from the pillar portion 75 of the car body and undesirable flying of the same can be prevented.

Hitherto, a joining structure, with which undesirable debris of the pillar garnish can be prevented, has been known which is arranged such that a bolt insertion hole in the form of a through hole is formed in each of upper and lower intermediate portions of the pillar garnish. Moreover, a bolt inserted into each bolt insertion hole is clamped and secured to the pillar portion of the car body. Note that the lower end of the pillar garnish is inserted into a hole or the like formed in the instrument panel P so as to be secured.

The joining structure using the bolt is arranged such that the pillar garnish is, in the bolt securing portion, completely secured to the pillar portion of the car body. Therefore, excessively large stress is exerted on the bolt securing portion when expansion of the air bag causes the side portion of the pillar garnish to be pressed and bent. Hence it follows that a conventional pillar garnish made of ABS resin (Acrylonitrile-Butadiene-Styrene resin) or PPF (PolyPropylene with inorganic material, for example, talc) cannot endure the foregoing stress. Thus, there is apprehension that the foregoing pillar garnish is broken. What is worse, the foregoing joining structure using the bolt must be arranged such that the operation for clamping the bolt can be performed from the designed surface (from the cabin portion) of the pillar garnish. Therefore, the head of the bolt appears on the designed side of the pillar garnish, causing the appearance to deteriorate. Accordingly, a blind cover is fitted to the bolt insertion hole from the designed surface of the pillar garnish. The blind cover portion is, however, easily recognized, causing the appearance to deteriorate.

To solve the above-mentioned problem caused from the blind cover, a structure, as shown in FIG. 21, may be employed in which a seat portion 62 is integrally formed to project over the reverse side of a predetermined position of a pillar garnish 60. Moreover, a head 66 of a rod-shape fixing metal member 65, such as a bolt, is embedded in the seat portion 62. Another end 69 of the rod-shape fixing metal member 65 is inserted and secured to the inside portion of an engaging hole 76 formed in an inner panel 71 of a pillar portion 75 of the car body. The rod-shape fixing metal member 65 is made of metal and incorporating a shaft portion 67 which has an end formed into a head 66 having a large diameter. Another end 69 of the shaft portion 67 is provided with an engaging portion 68. The illustrated rod-shape fixing metal member 65 incorporates a bolt and a nut which is the engaging portion 68. Referring to the drawing, symbol F represents a front glass, symbol C represents an electric line extended from an engine room, reference numeral 77 represents an opening trim, 78 represents a glass-run channel and 79 represents a body frame.

When the joining structure shown in FIG. 21 is employed, the existence of a side surface 63 of the seat portion 62 causes the thickness of the pillar garnish 60 to locally be changed. Hence it follows that sink mark 64 easily occurs, as shown in FIG. 22. As a method of preventing occurrence of the sink mark 64, a method may be employed with which thickness K2 of the side surface 63 of the seat portion 62 is made to be smaller than thickness K1 of the outer portion of the seat portion (it is preferable that K2 is ½ of K1). If the thickness K2 of the side surface 63 of the seat portion 62 is reduced until the sink mark 64 can be prevented, concentration of stress causes a crack to be formed in a base portion 61a of the side surface 63 of the seat portion 62 which serves as a hinge portion when the pillar garnish 60 is pushed and bent owing to the expansion of the air bag A, as shown in FIG. 23.

The pillar garnish 60 structured as described above is formed such that the head 66 of the rod-shape fixing metal member 65 comprising the bolt or the like is directly insert-molded. In the foregoing case, the following fact is known: embedding of the head 66 causes the thickness of the resin portion of the pillar garnish upper than the head 66, that is, the thickness of the resin portion of the pillar garnish which is surrounded by the side surface 63 of the seat portion 62 to be nonuniform. In this case, the foregoing structure easily encounters sink mark occurring in the designed surface of the pillar garnish 60. The foregoing portion of a usual pillar garnish which is secured by the bolt or the like is usually formed into a curved surface owing to a requirement for improving the design quality. The head 66 of the usual rod-shape fixing metal member 65, such as the bolt, is formed into a flat shape. Therefore, the distance from the surface of the head 66 of the rod-shape fixing metal member 65 to the designed surface of the pillar garnish 60, that is, the thickness of the resin portion of the pillar garnish in the foregoing portion cannot easily be uniformed. Thus, occurrence of the sink mark cannot be prevented. When the thickness of the resin portion of the pillar garnish which is surrounded by the side surface 63 of the seat portion is attempted to be constant, the surface of the head 66 of the rod-shape fixing metal member 65 is formed to have a shape corresponding to the designed surface of the pillar garnish 60. To employ the foregoing structure, a specially-designed rod-shape fixing metal member is required. In the foregoing case, required cost reduction is not permitted.

Moreover, it is preferable that the foregoing joining structure is arranged in such a manner that the quantity of projection of the pillar garnish 60 into the cabin is reduced to enlarge the space in the cabin in usual state. Moreover, when the air bag A is expanded, smooth expansion of the air bag A must be permitted by maximally enlarging the space for accommodating the air bag A, that is, maximally elongating the distance from the pillar portion 75 of the car body to the pillar garnish 60. Therefore, the foregoing joining structure is arranged such that when the pillar garnish 60 has been pressed against the inside portion of the cabin owing to the expansion of the air bag A, movement of the rod-shape fixing metal member 65 together with the pillar garnish 60 in a direction toward the cabin for a predetermined distance must be permitted. To achieve this, the side surface of a shaft portion 67 of the rod-shape fixing metal member 65 is not engaged to the engaging hole 76. As an alternative to this, a state is realized in which the side surface is simply inserted into the engaging hole 76. Moreover, clearance M required to permit sliding of the rod-shape fixing metal member 65 is provided between the engaging hole 76 and the engaging portion 68 of the another end 69 of the shaft portion 67. In addition, another clearance N for facilitating the operation exists between the outer surface of the shaft portion 67 of the rod-shape fixing metal member 65 and the inner surface of the engaging hole 76. Since the clearances M and N exist as described above, looseness is sometimes felt in a usual state when the pillar garnish 60 is, from the inside portion of the cabin, pressed at a position adjacent to the head portion 66 of the rod-shape fixing metal member 65. When the automobile is being driven, there is apprehension that vibrations cause the shaft portion 67 of the rod-shape fixing metal member 65 to be brought into contact with the engaging hole 76 and noise to be produced.

SUMMARY OF THE INVENTION

In view of the foregoing, an object of the present invention is to provide a structure for joining a pillar garnish including an air bag with which the appearance of the pillar garnish can be improved because sink mark can be prevented, which has a simple structure and which is able to prevent separation, breakage and so forth of the pillar garnish which occur when the air bag is expanded and developed.

Another object of the present invention is to provide a structure for joining a pillar garnish including an air bag which does not reduce the space in the cabin in a usual state and with which looseness and noise do not easily take place if pressure and vibrations are exerted from the inside portion of the cabin.

According to a first aspect of the present invention, there is provided a structure for joining a pillar garnish including an air bag, comprising: a pillar garnish made of synthetic resin and having a reverse side from which a seat portion projects into which a head of a rod-shape fixing metal member having a shaft portion incorporating an end which is formed into the head having a large diameter and another end provided with an engaging portion is embedded when the pillar garnish is injection-molded and having a structure that the engaging portion of the rod-shape fixing metal member is inserted and engaged into an engaging hole formed in a pillar portion of a car body to join the pillar garnish and engagement between the rod-shape fixing metal member and the engaging hole caused when an air bag accommodated on the reverse side of the pillar garnish is expanded is used to prevent separation of the pillar garnish, wherein the head of the rod-shape fixing metal member is covered with a coating layer made of synthetic resin to make the surface of the coating layer to have the same shape as the shape of a portion of the surface of the pillar garnish which is surrounded by the side surfaces of the seat portion so that the thickness of the portion of the pillar garnish surrounded by the side surfaces of the seat portion is substantially uniformed, the resin for constituting the pillar garnish is a polyolefine thermoplastic elastomer, and the resin for constituting the coating layer is a polyolefine thermoplastic elastomer containing polypropylene by 40 wt % or greater and having the relationship between peak area S1 which indicates a heating value required to melt polypropylene and detected by differential scanning calorie measurement (DSC) and peak area S2 indicating a heating value required to melt a component which is melted at a temperature lower than the temperature at which polypropylene is melted, the relationship satisfying S2/S1<½.

According to a second aspect of the present invention, there is provided the structure according to the first aspect of the present invention, wherein reinforcing ribs are radially formed on the outer side surfaces of the seat portion adjacent to a portion to which the air bag is developed.

According to a third aspect of the present invention, there is provided a structure for joining a pillar garnish including an air bag, comprising: apillar garnish made of synthetic resin; and a rod-shape fixing metal member having an end secured to the pillar garnish and an engaging portion formed at another end and inserted into an engaging hole formed in an inner panel of a pillar portion of a car body to join the pillar garnish so that when the pillar garnish is pushed and bent owing to expansion of an air bag accommodated on the reverse side of the pillar garnish, the engaging portion formed at the other end of the rod-shape fixing metal member and the engaging hole are engaged to each other to prevent separation of the pillar garnish, wherein the outer surface of a side portion of a shaft portion of the rod-shape fixing metal member is covered with a covering member, and the outer surface of the covering member is engaged and temporarily secured to the engaging hole formed in the pillar portion, and when the pillar garnish is pushed and bent owing to the expansion of the air bag, engagement of the covering member and the engaging hole is suspended so that the engaging hole and the engaging portion at the other portion of the rod-shape fixing metal member are engaged to each other.

According to a fourth aspect of the present invention, there is provided the structure according to the third aspect of the present invention, wherein an engaging groove arranged to be engaged to the engaging hole formed in the pillar portion to temporarily secure the engaging hole is formed in the outer surface of the covering member of the rod-shape fixing metal member, and the outer diameter of a leading end of the covering member adjacent to the engaging portion of the rod-shape fixing metal member is smaller than the outer diameter of the engaging portion of the rod-shape fixing metal member.

According to a fifth aspect of the present invention, there is provided the structure, wherein a holes-connected passage and an insertion hole communicated with the engaging hole through the holes-connected are formed in the pillar portion, and the following relationship is held: (diameter L1 of the insertion hole)≧(outer diameter X of the outer end of the engaging groove adjacent to the engaging portion of the rod-shape fixing metal member)>(diameter L3 of the engaging hole)≧(inner diameter Y of the engaging groove)>(width L2 of the holes-connected passage), and (thickness T of the pillar portion of the inner panel)<(width Z of the engaging groove)<3T.

According to a sixth aspect of the present invention, there is provided the structure according to any one of the 3rd to 5th aspect of the present invention, wherein the covering member which covers the outer surface of the side portion of the shaft portion of the rod-shape fixing metal member is made of resin.

According to a seventh aspect of the present invention, there is provided the structure according to the sixth aspect of the present invention, wherein an end of the rod-shape fixing metal member is formed into a head having a diameter larger than the diameter of the shaft portion and the outer surface which is covered by the covering member, and the head of the rod-shape fixing metal member is, together with the covering member of the head, is embedded in a seat portion formed to project over the reverse side of the pillar garnish.

BRIEF DESCRIPTION OF THE DRAWINGS

FIG. 1 is a schematic view showing the inside portion of a cabin to which a pillar garnish has been joined by the joining structure according to the present invention.

FIG. 2 is a cross sectional view taken along line 2—2 shown in FIG. 1.

FIG. 15 is a cross sectional view showing the pillar garnish when an air bag has been expanded.

DETAILED DESCRIPTION OF THE PRESENT INVENTION

Figure 3:
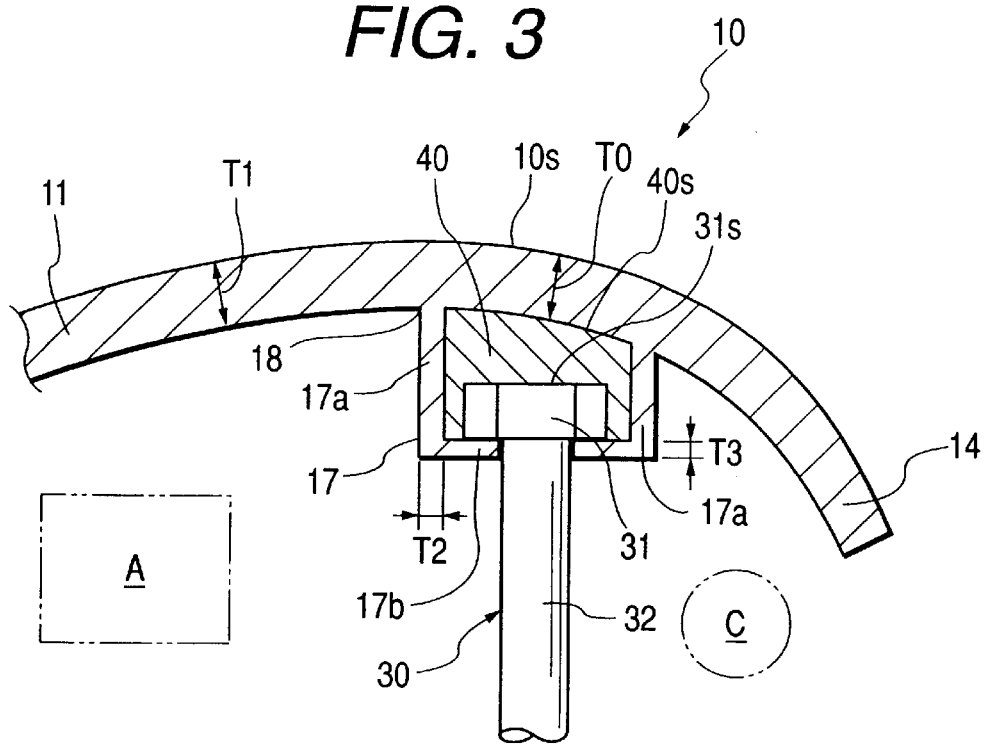
FIG. 3 is an enlarged cross sectional view showing a portion in the vicinity of the rod-shape fixing metal member shown in FIG. 2.

Referring to the drawings, embodiments of the present invention will now be described.

(First embodiment)

Figure 4:
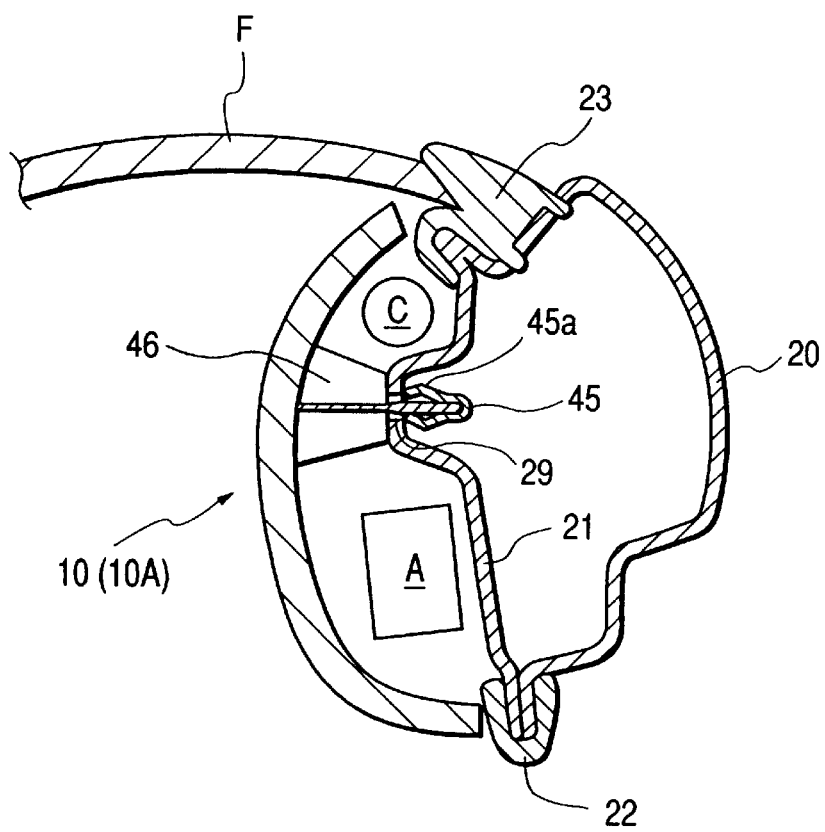
FIG. 4 is a cross sectional view taken along line 4—4 shown in FIG. 1.
Figure 5:
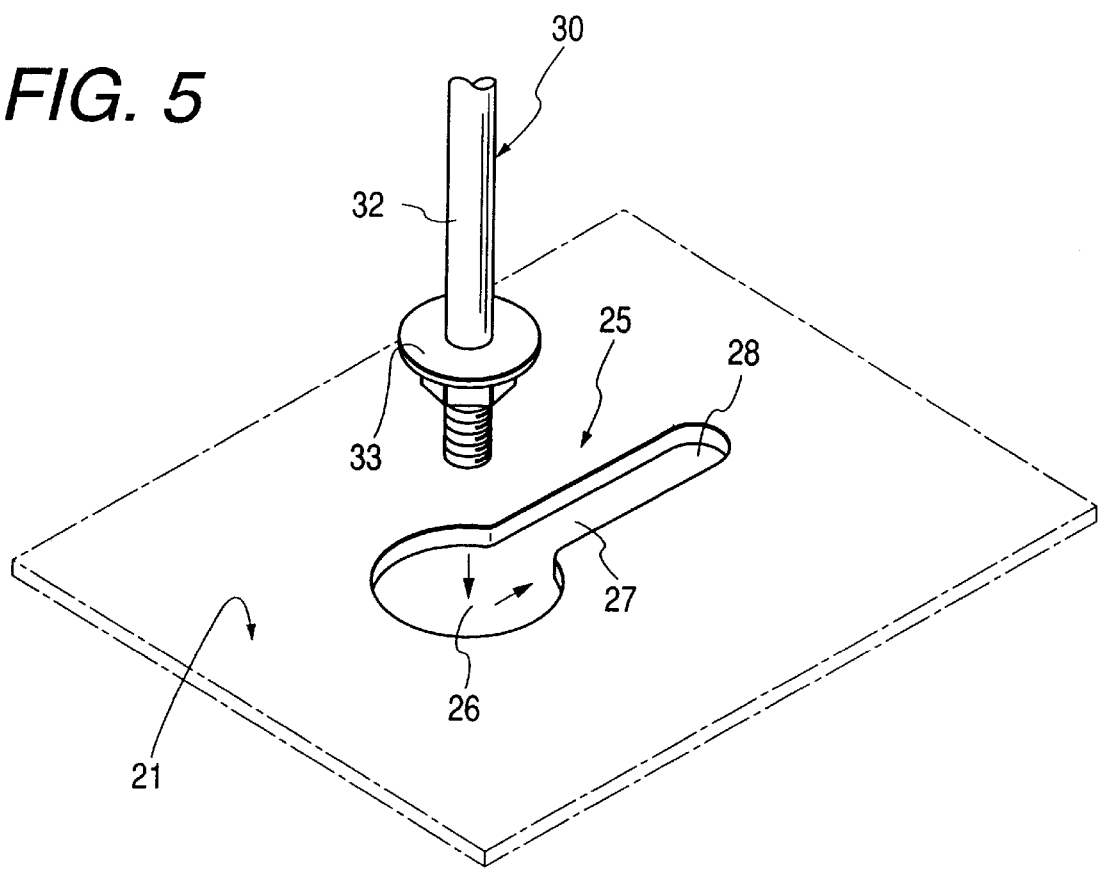
FIG. 5 is a partial and perspective view showing a state in which the pillar garnish shown in FIG. 1 is joined.
Figure 6:
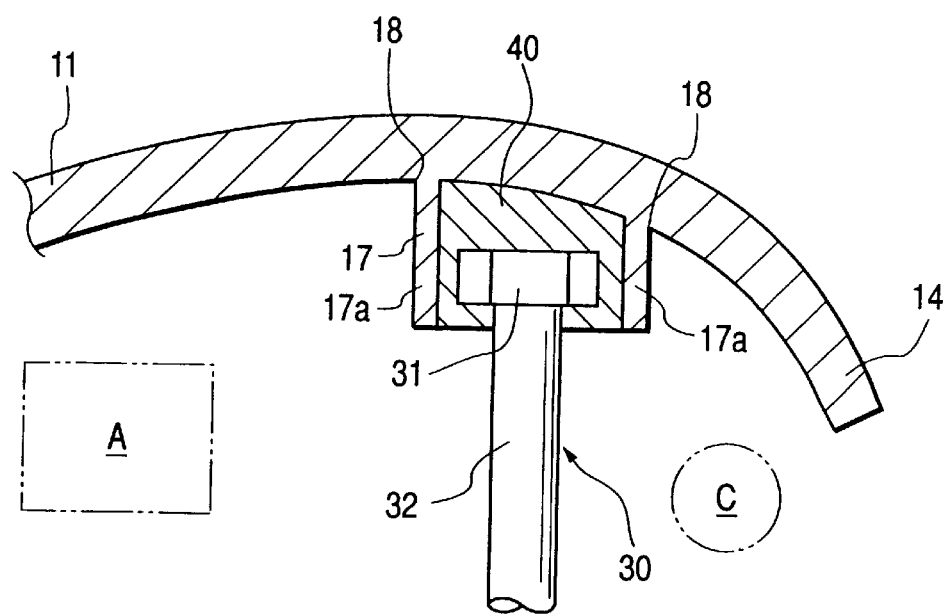
FIG. 6 is a cross sectional view showing a structure in which a bottom surface of a seat portion is omitted.
Figure 7A:
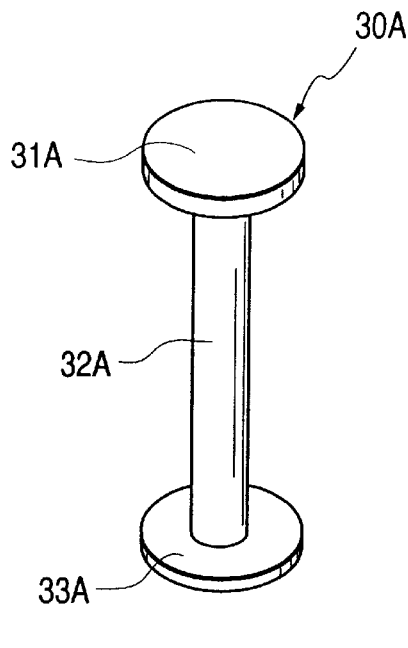
FIGS. 7A and 7B are perspective views each showing another example of the rod-shape fixing metal member.
Figure 7B:
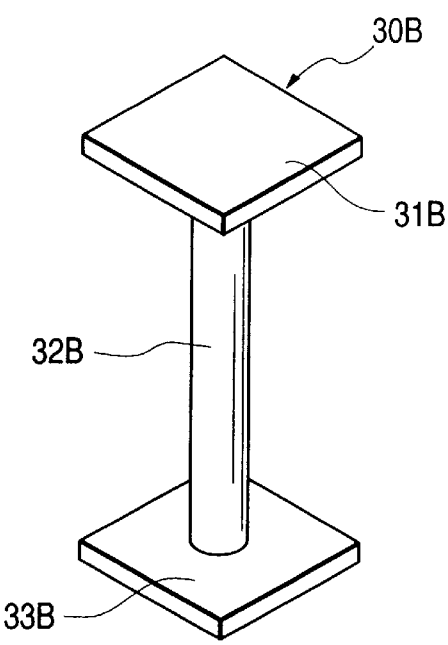
Figure 8:
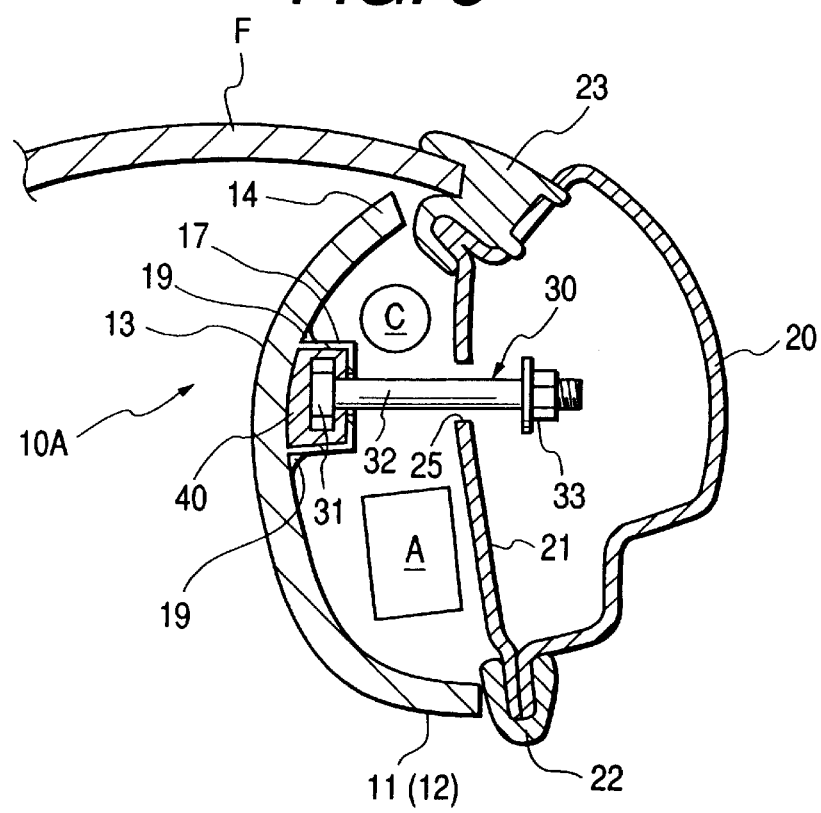
FIG. 8 is a cross sectional view taken along line 2—2 shown in FIG. 1 and showing an embodiment of the present invention.
Figure 9:
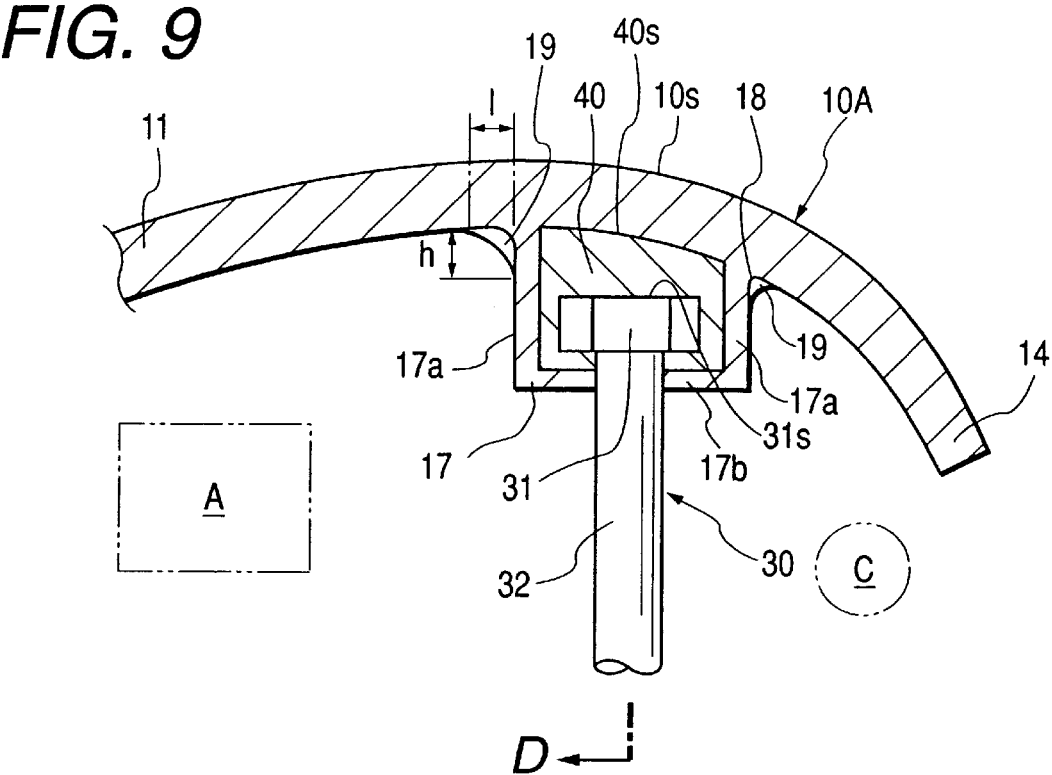
FIG. 9 is a cross sectional view showing a portion in the vicinity of the rod-shape fixing metal member shown in FIG. 8.
Figure 10:
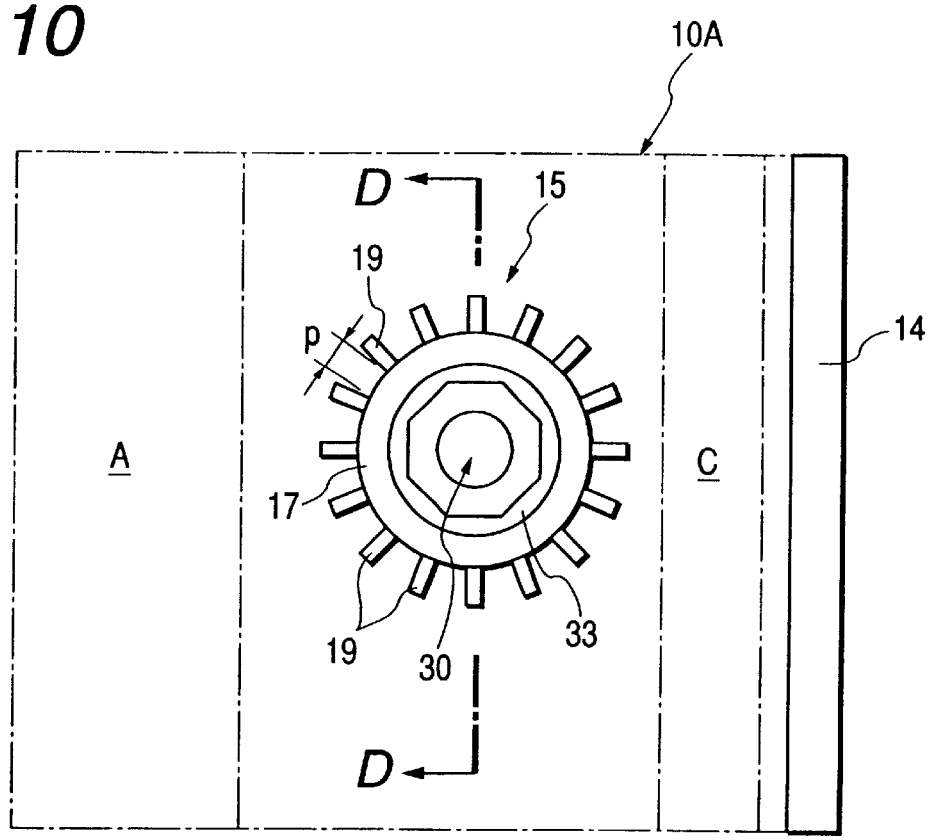
FIG. 10 is a bottom view showing the seat portion shown in FIG. 9.
Figure 11:
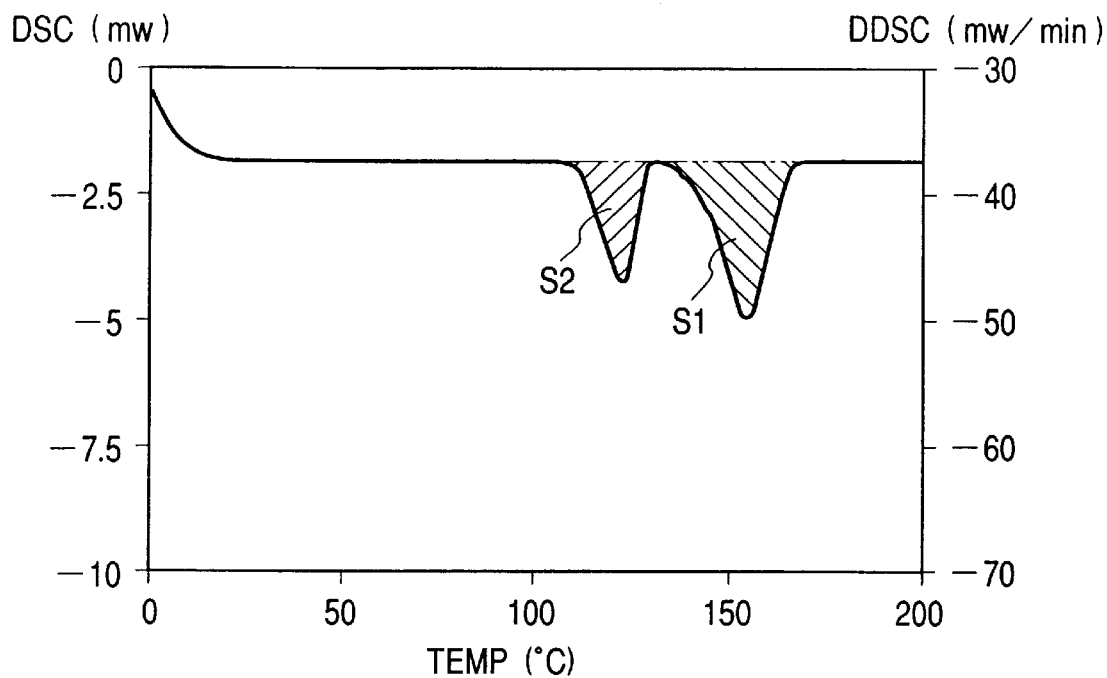
FIG. 11 is a graph of DSC of resin which constitute a covering layer.

FIG. 1 is a schematic view showing the inside portion of a cabin to which a pillar garnish has been joined by the joining structure according to the present invention. FIG. 2 is a cross sectional view taken along line 2—2 shown in FIG. 1. FIG. 3 is an enlarged cross sectional view showing a portion in the vicinity of the rod-shape fixing metal member shown in FIG. 2. FIG. 4 is a cross sectional view taken along line 4—4 shown in FIG. 1. FIG. 5 is a partial and perspective view showing a state in which the pillar garnish shown in FIG. 1 is joined. FIG. 6 is a cross sectional view showing a structure in which a bottom surface of a seat portion is omitted. FIG. 7 is a perspective view showing another example of the rod-shape fixing metal member. FIG. 8 is a cross sectional view taken along line 2—2 shown in FIG. 1. FIG. 9 is a cross sectional view showing a portion in the vicinity of the rod-shape fixing metal member shown in FIG. 8. FIG. 10 is a bottom view showing the seat portion shown in FIG. 9. FIG. 11 is a graph of DSC of resin which constitute a covering layer.

As shown in FIGS. 1 to 3, a pillar garnish 10 according to the present invention is joined to a pillar portion 20 of the car body disposed above an instrument panel P of an automobile in a state in which an air bag A is folded on the reverse side of the pillar garnish 10. Thus, the pillar garnish 10 covers the surface of the pillar portion 20 facing the inside portion of the cabin. If collision of the automobile occurs, an inflater I disposed adjacent to the instrument panel P is operated to forcibly introduce gas into the air bag A. Thus, expansion of the air bag A, which starts at a position adjacent to the instrument panel P (a position below the pillar garnish 10), is sequentially caused. Thus, a side end 12 of a rear portion 11 of the pillar garnish 10 (that is, a portion adjacent to the side glass G) positioned in the relatively rear portion of the cabin is pushed and bent toward the inside portion of the cabin. The air bag A is, on the inside of the side glass G, developed through a gap between the pushed and bent side end 12 of the pillar garnish 10 and the pillar portion 20 of the car body. Thus, the head of a passenger is mainly protected.

The pillargarnish 10 ismanufacturedby injection-molding and constituted by a synthetic-resin cover member having a lateral cross sectional shape expanding to the inside portion of the cabin and a predetermined length. The portion 11 of the pillar garnish 10 positioned in the relatively rear portion of the cabin (that is, the portion adjacent to the side glass G) is made to be a portion for accommodating the air bag A such that substantially a central position 13 in the widthwise direction corresponding to the longitudinal direction of the vehicle is the boundary. A portion 14 positioned in the relatively front portion of the cabin (that is, the portion adjacent to the front glass F) is made to be a portion for accommodating a power supply cord C extended from an engine room and so forth. Reference numeral 22 represents an opening trim and 23 represents a glass run channel.

Resin for constituting the pillar garnish 10 is adequate TPO (Thermoplastic Polyolefine Elastomer). Since the pillar garnish 10 is usually an elongated member having a length of 50 cm or more, change in the size easily occurs owing to thermal expansion which takes place due to high temperature in the cabin realized in summer. What is worse, strength in the vicinity of a portion of the pillar garnish 10 which is joined to the pillar portion easily decreases owing to softening of the resin at high temperatures. In consideration of areas and seasons in which the automobile is used, breakage and debris of the pillar garnish occurring when the air bag is expanded must be prevented in a range from a low temperature (−35° C.) to a high temperature (90° C.). In addition, the resin must have adequate hardness (softness) to easily join the pillar garnish 10 to the pillar portion of the car body. It is preferable that the resin for constituting the pillar garnish is TPO which has an izod impact value (−35° C., JIS K 7110) which is greater than 20 kg·cm/cm, a bending elastic modulus (JIS K 7203) which is higher than 4,500 kg/cm , heat resisting and deforming temperature (a load of 4.6 kg, JIS K 7207) which is higher than 90° C. and a coefficient of linear expansion (−35° C. to 90° C., ASTM D696) which is smaller than 10° C.·cm/cm.

The pillar garnish 10 has a lower end which is inserted and secured to the inside portion of a hole (not shown) formed in the instrument panel P. The intermediate portion of the pillar garnish 10 is joined to the pillar portion 20 of the car body at four joining portions 15 and 16 formed in the lengthwise direction of the pillar garnish 10. The joining portions 15 and 16 according to this embodiment consist of the separation-preventive joining portions 15 which act when the air bag A is expanded and the looseness-preventive joining portions 16 which are used in a usual state. The separation-preventive joining portions 15 and the looseness-preventive joining portions 16 are alternately formed from the lower portion of the pillar garnish 10.

The separation-preventive joining portion 15 has a seat portion 17 formed to project over the reverse side of the pillar garnish 10. A head 31 of a rod-shape fixing metal member 30 is embedded and secured in the seat portion 17. The seat portion 17 has a side surface 17a and a bottom surface 17b. The head 31 of the rod-shape fixing metal member 30 is embedded in a portion surrounded by the side surface 17a and the bottom surface 17b. When a coating layer 40, to be described later, is firmly welded to the reverse side of the pillar garnish 10 and the side surface 17a, it can be considered that the thickness of the bottom surface 17b is zero, that is, the bottom surface 17b does not exist, as shown in FIG. 6.

It is preferable that thickness T2 of the side surface 17a of the seat portion 17, thickness T3 of the bottom surface 17b and thickness T1 of the pillar garnish 10 on the outside of the seat portion 17 satisfy the relationship that T1>T2>T3≧0. If the foregoing thicknesses satisfy the above-mentioned relationship, the rigidity of the side surface 17a of the seat portion 17 decreases. Therefore, concentration of stress to a base portion 18 of the side surface 17a of the seat portion 17 which serves as a hinge portion when the pillar garnish 10 is pressed and bent into the inside portion of the cabin can be reduced. As a result, formation of a crack in the base portion 18 of the side surface 17a of the seat portion 17 which occurs when the air bag A is expanded can be prevented.

The rod-shape fixing metal member 30 incorporates a shaft portion 32 having an end formed into a head 31 having a large diameter. An engaging portion 33 is formed at another end of the shaft portion 32. The rod-shape fixing metal member 30 according to this embodiment incorporates a bolt and a nut. The head of the bolt constitutes the head 31 of the rod-shape fixing metal member, while the nut constitutes the engaging portion 33. The nut serving as the engaging portion 33 is joined to the bolt with a thread such that the nut is, for example, welded to a position apart from the head 31 for a predetermined distance in such a manner that shift of the position of the nut is prevented. The distance from the head 31 to the engaging portion 33 is made to be longer than the distance from the head 31 and an inner panel 21 of the pillar portion 20 of the car body which is realized when the pillar garnish 10 has been joined to the pillar portion 20 of the car body.

The rod-shape fixing metal member 30 is not limited to the bolt and the nut. Another structure may be employed if the diameters of the head 31 and the engaging portion 33 are larger than the diameter of the shaft portion 32 and the distance from the head 31 to the engaging portion 33 is the above-mentioned predetermined distance. For example, rod-shape fixing metal members 30A and 30B shown in FIGS. 7(A) and 7(B) may be employed which have structures that enlarged heads 31A and 31B are welded and secured to ends of shaft portions 32A and 32B and enlarged engaging portions 33A and 33B are welded and secured to other ends. Any one of adequate structures may be employed.

The head 31 of the rod-shape fixing metal member 30 is previously coated with a coating layer 40 made of synthetic resin by injection molding or the like. In the above-mentioned state, the head 31 is embedded in the seat portion 17 when the pillar garnish 10 is injection-molded. The coating layer 40 arranged to cover the head 31 and made of synthetic resin is structured such that a surface 40s of the coating layer 40 positioned at a surface 31s of the head 31 has the same shape as a pillar garnish portion 10s of the pillar garnish surrounded by the side surface 17a of the seat portion 17. As a result, thickness T0 of a resin portion of the pillar garnish 10 is uniformed in the portion in which the head 31 is embedded, that is, in the pillar garnish portion 10s covered with the side surface 17a of the seat portion 17. As a result, sink mark of the designed surface of the pillar garnish 10 can be prevented which is caused from nonuniformity of the thickness of the resin portion.

The head 31 of the rod-shape fixing metal member 30 in the state in which the head 31 is covered with the coating layer 40 is disposed as an insert. Moreover, the pillar garnish 10 is injection-molded in the above-mentioned state. Therefore, the surface of the coating layer 40 is melted owing to heat for molding the pillar garnish 10 which is generated in the mold. Therefore, the head 31 of the rod-shape fixing metal member 30 is, through the coating layer 40, welded and integrated with the reverse side of the pillar garnish 10 and the side surface 17a of the seat portion 17. If the welding strength realized owing to the injection molding is weak, the side surface 17a is separated from the coating layer 40 when the pillar garnish 10 is pressed and bent. Thus, stress is concentrated to the base portion 18 of the seat portion 17, which serves as the hinge portion, causing a crack to easily occur. Therefore, it is preferable that the welding strength is great.

The welding effect occurs during the injection molding such that the coating layer 40 is made contact with the molten resin for molding the pillar garnish injected into the mold. Thus, heat of the molten resin is deprived by the coating layer 40 so that the coating layer 40 is melted. The heat of the molten resin is not continuously replenished after the injection molding has been completed. Moreover, the molten resin is made contact with the surface of the mold after the injection molding has been completed, causing the molten resin to quickly be cooled and solidified. Therefore, the heating value which can be used to melt the coating layer 40 is limited. As a result, there is apprehension that the surface of the coating layer 40 is not sufficiently melted and satisfactory welded strength between the coating layer 40 and the seat portion 17 and the like cannot be obtained.

When the resin for constituting the pillar garnish 10 is TPO, it is preferable that also the resin for constituting the coating layer 40 is TPO having compatibility with the resin of the pillar garnish 10 from a viewpoint of reliable welding. The TPO contains, as a main component, PP (polypropylene), PP of a type containing a rubber material, such as EPR (ethylene propylene rubber), PE (polyethylene) for reinforcing the rubber material, softening agent and so forth. The weldability of the TPO members can mainly be realized by PP. To increase the welding strength between the coating layer 40 and the seat portion 17 of the pillar garnish 10 and the like, heat of the injected and melted resin must be supplied to PP in the TPO which constitutes the coating layer 40 so as to reliably melt the PP.

An operation for measuring differential scanning calorie (called "DSC") of a certain type TPO for constituting the coating layer 40 was performed- Results shown in FIG. 11 were obtained. Thus, a fact was understood that the other component of the foregoing TPO was melted at low temperatures prior to melting of the PP component which was the main component of the TPO. Then, the PP component was melted. Therefore, when injection molding of the pillar garnish is performed, heat of the injection-molded resin is initially used to melt the other component of TPO which constitutes the coating layer 40, the other component having a melting point lower than that of the PP component. A residual portion of the heat is used to melt the PP of the coating layer 40. Therefore, the PP component cannot sufficiently be melted depending on the type of the TPO of the coating layer 40. Thus, the welding strength between the coating layer 40 and the seat portion 17 of the pillar garnish 10 and the like sometimes become insufficient.

The inventor of the present invention has performed a variety of investigations about the relationship among the results of the measurement of the DSC of the foregoing TPO and the welding strength (cracks in the base portion of the seat portion which serves as the hinge portion) of the coating layer 40 with respect to the seat portion 17 of the pillar garnish 10 and the like. As a result, the following fact was detected. The TPO of the coating layer 40 must contain polypropylene by 40 wt % or more. Moreover, the relationship between peak area S1 indicating a heating value required to melt polypropylene and detected by differential scanning calorie measurement (DSC) and peak area S2 indicating a heating value required to melt a component which is melted at a temperature lower than the temperature at which polypropylene is melted must satisfy S2/S1<½. If the foregoing relationship is realized, any crack is formed in the hinge portion which is the base portion 18 of the seat portion 17 when the pillar garnish 10 is opened owing to the expansion of the air bag A.

The component which is melted at temperatures lower than the temperature at which polypropylene is melted is exemplified by high-density PE, low-density PE, an ethylene-α olefine copolymer, a PE copolymer, such as an ethylene-acrylic acid copolymer, and a styrene polymer, such as a polymer, for example, SEBS (a styrene-ethylene-butene-styrene copolymer), which is melted at temperatures lower than the temperature at which polypropylene is melted.

It is furthermore preferable that the relationship between bending elastic modulus F1 of the resin which constitutes the coating layer 40 and bending elastic modulus F2 (the bending elastic moduli F1 and F2 are measured by ASTM D 790) of the synthetic resin which constitutes the pillar garnish 10 satisfies F1<F2. When the resin is selected as described above, increase in the overall rigidity of the seat portion 17 can be prevented. When the pillar garnish 10 is pressed owing to the expansion of the air bag A, the pillar garnish 10 can easily be bent in the vicinity of the seat portion 17. Therefore, formation of a crack in the base portion 18 of the side surface 17a which serves as the hinge portion can be prevented. It is preferable that the range of the bending elastic modulus F1 of the resin which constitutes the coating layer 40 satisfies 2000 kg/cm$^2$ to 7000 kg/cm$^2$. It is preferable that the range of the bending elastic modulus F2 of the resin which constitutes the pillar garnish 10 satisfies 5000 kg/cm$^2$ to 10000 kg/cm$^2$.

As shown in FIG. 4, the looseness-preventive joining portion 16 is structured such that a clip 45 made of metal or resin is secured to a clip seat portion 46 formed on the reverse side of the pillar garnish 10. The clip 45 is inserted and secured to the inside portion of a clip hole 29 formed in the inner panel 21 of the pillar portion 20 of the car body. The clip 45 according to this embodiment incorporates an engaging member 45a bent to expand outwards. When the pillar garnish 10 has been joined to the pillar portion 20 of the car body, the engaging member 45a secures the pillar garnish 10 to the pillar portion 20 of the car body without any looseness. When the pillar garnish 10 is pushed and bent owing to the expansion of the air bag A, the clip 45 is separated from the clip hole 29 of the inner panel 21. The clip seat portion 46 is constituted by rib-shape members each having a small thickness to prevent occurrence of sink mark in the designed surface of the pillar garnish 10.

The pillar portion 20 of the car body which is joined to the pillar garnish 10 is structured such that the clip hole 29 and an engaging hole 25 as shown in FIG. 5 are formed in the inner panel 21 at positions corresponding to the position of the seat portion 17 for the rod-shape fixing metal member 30. The engaging hole 25 is an elongated hole formed in the lengthwise direction of the pillar garnish 10 and having a predetermined length. The engaging hole 25 has a large-diameter hole 26 at a lower end thereof, the large-diameter hole 26 being a hole through which the engaging portion 33 of the rod-shape fixing metal member 30 can be inserted. Moreover, a shaft insertion passage 27 is formed above the large-diameter hole 26, the shaft insertion passage 27 having a size smaller than the diameter of the engaging portion 33 and permitting insertion of the shaft portion 32. When the pillar garnish 10 is joined, the engaging portion 33 of the rod-shape fixing metal member 30 is initially inserted into the large-diameter hole 26 of the engaging hole 25. Then, the pillar garnish 10 is upwards slid along the pillar portion 20 of the car body until the shaft portion 32 is brought into contact with an upper end 28 of the shaft insertion passage 27. Thus, the clip 45 is moved to a position above the clip hole 29 of the inner panel 21. Then, the pillar garnish 10 is, at the foregoing position, strongly pushed toward the inner panel 21 to insert and engage the clip 45 into the clip hole 29. As a result, joining of the pillar garnish 10 is completed.

Separation of the pillar garnish 10 joined to the pillar portion 20 of the car body from the pillar portion 20 of the car body can be prevented as follows: when the pillar garnish 10 is pushed and bent toward the inside portion of the cabin owing to the expansion of the air bag A, the engaging portion 33 of the rod-shape fixing metal member 30 is engaged (brought into contact with the reverse side of the shaft insertion passage 27) to the shaft insertion passage 27 of the engaging hole 25 of the inner panel 21.

Table 1 shows results of investigations of examples and a comparative examples of the structure for securing the pillar garnish 10. The relationship among the weight percent of polypropylene of TPO which constitutes the coating layer 40, peak area S1 indicating a heating value required to melt polypropylene, peak area S2 indicating a heating value required to melt a component which is melted at a temperature lower than the temperature required to melt polypropylene and whether or not a problem has arisen when the air bag A has been developed. The material of the pillar garnish 10 was TPO. Moreover, the values of S1 and S2 were obtained by a measuring apparatus manufactured by Seiko Instruments Inc. and by performing measurement of DSC during a process in which the temperature was raised at a rate of 10° C./minute. Whether or not a problem has arisen when the air bag A was developed was evaluated by performing tests such that the pillar garnish 10 was joined to a jig, followed by expanding the air bag A. The evaluation was performed in accordance with fact whether or not a crack was formed in the base portion 18 of the side surface 17a and separation between the pillar garnish 10 and the coating layer 40 occurred.

As can be understood from Table 1, Examples 1 to 3 were free from formation of a crack of the base portion 18 of the seat portion 17 when the air bag was developed. That is, no problem was raised. On the other hand, each of Comparative Examples 1 and 2 encountered a problem in that the side surface 17a of the seat portion 17 was separated from the coating layer 40 and, therefore a crack was formed in the base portion 18 of the seat portion 17. Note that bending elastic moduli F1 and F2 were measured by a method conforming to ASTM D 790.

[Table 1]

|  | Example 1 | Example 2 | Example 3 | Comparative Example 1 | Comparative Example 2 |
|---|---|---|---|---|---|
| Weight ratio (%) of PP in Coating Layer | 65 | 70 | 50 | 50 | 35 |
| S2/S1 | 0 | 0 | 0.4 | 0.6 | 0.4 |
| Bending Elastic Modulus (F1) of Coating Layer (kg/cm$^2$) | 7500 | 8000 | 4500 | 4500 | 2500 |
| Bending Elastic Modulus F2 of Pillar Garnish (kg/cm$^2$) | 7000 | 7000 | 7000 | 7000 | 7000 |
| Problem When Air Bag was Developed | No Problem | No Problem | No Problem | Problem Was Raised | Problem Was Raised |

The pillar garnish 10A shown in FIGS. 8 to 10 has the reinforcing ribs 19 formed on the outside of the side surface 17a of the seat portion 17. Therefore, when the pillar garnish 10A is pushed and bent owing to expansion of the air bag A, propagation in the base portion 18 of the side surface 17a of the seat portion 17 can furthermore reliably be prevented. It is preferable that each of the reinforcing ribs 19 is formed to have a thickness of 0.8 mm to 2.5 mm, a height of 2 mm to 10 mm, a length of 2 mm to 10 mm and a pitch between ribs of 1mm to 10mm also in consideration of surface mark of the designed surface of pillar garnish 10A. As a matter of course, the bottom surface 17b of the seat portion 17 may be omitted. It is preferable that the reinforcing ribs 19 are disposed at least on the development side D of the air bag A of the seat portion 17.

(Second embodiment)

The second embodiment of the present invention will be described in detailed as follows referring to FIGS. 1 and 12 to 18. The descriptions which have been described in the first embodiment are omitted from the descriptions of the second embodiment.

Figure 16:
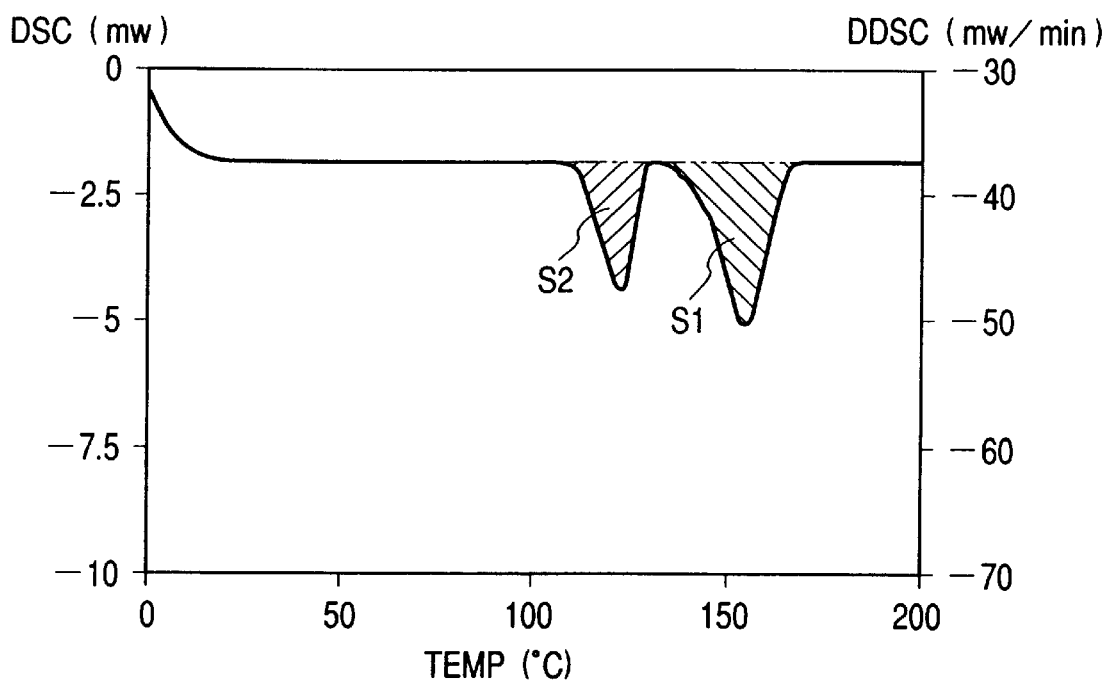
FIG. 16 is a graph of DSC.
Figure 12:
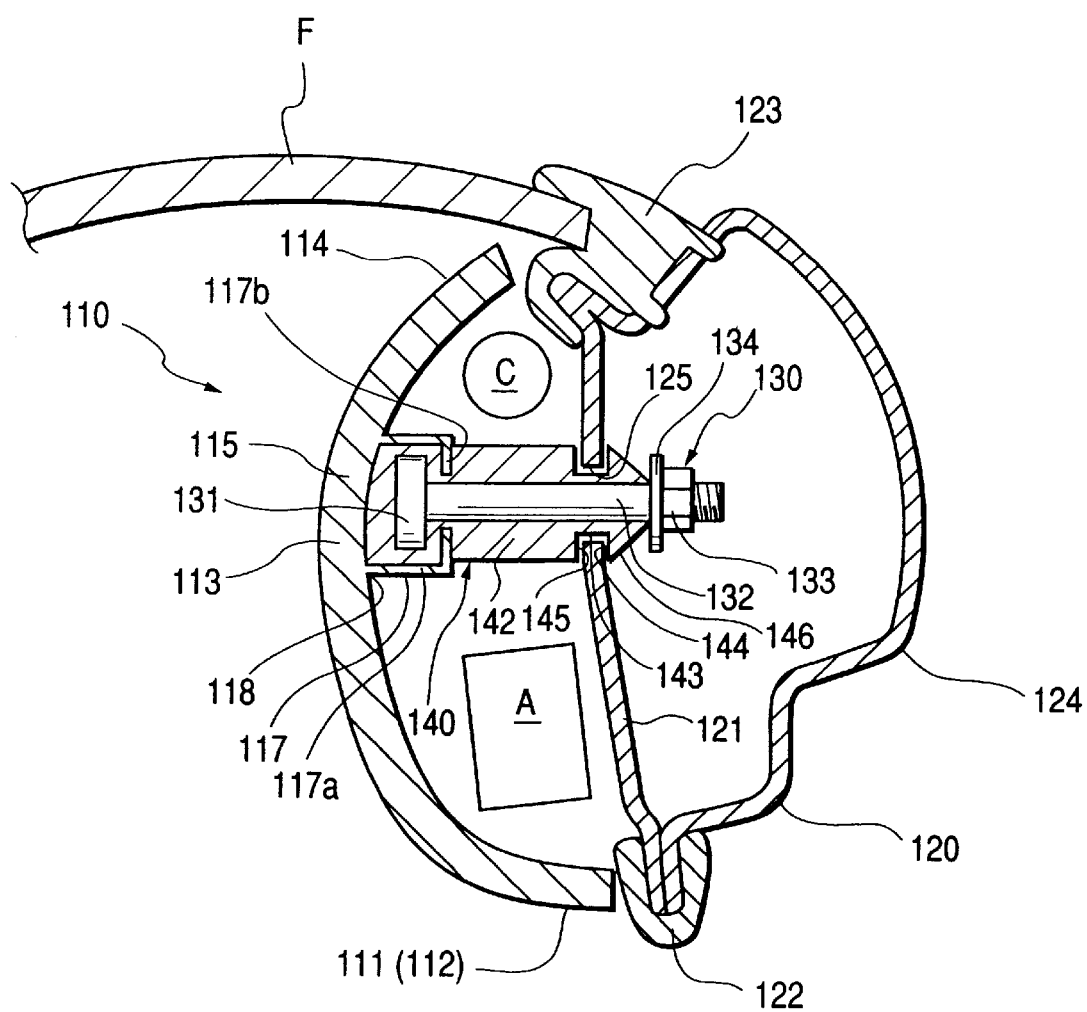
FIG. 12 is a cross sectional view taken along line 2—2 shown in FIG. 1.
Figure 13:
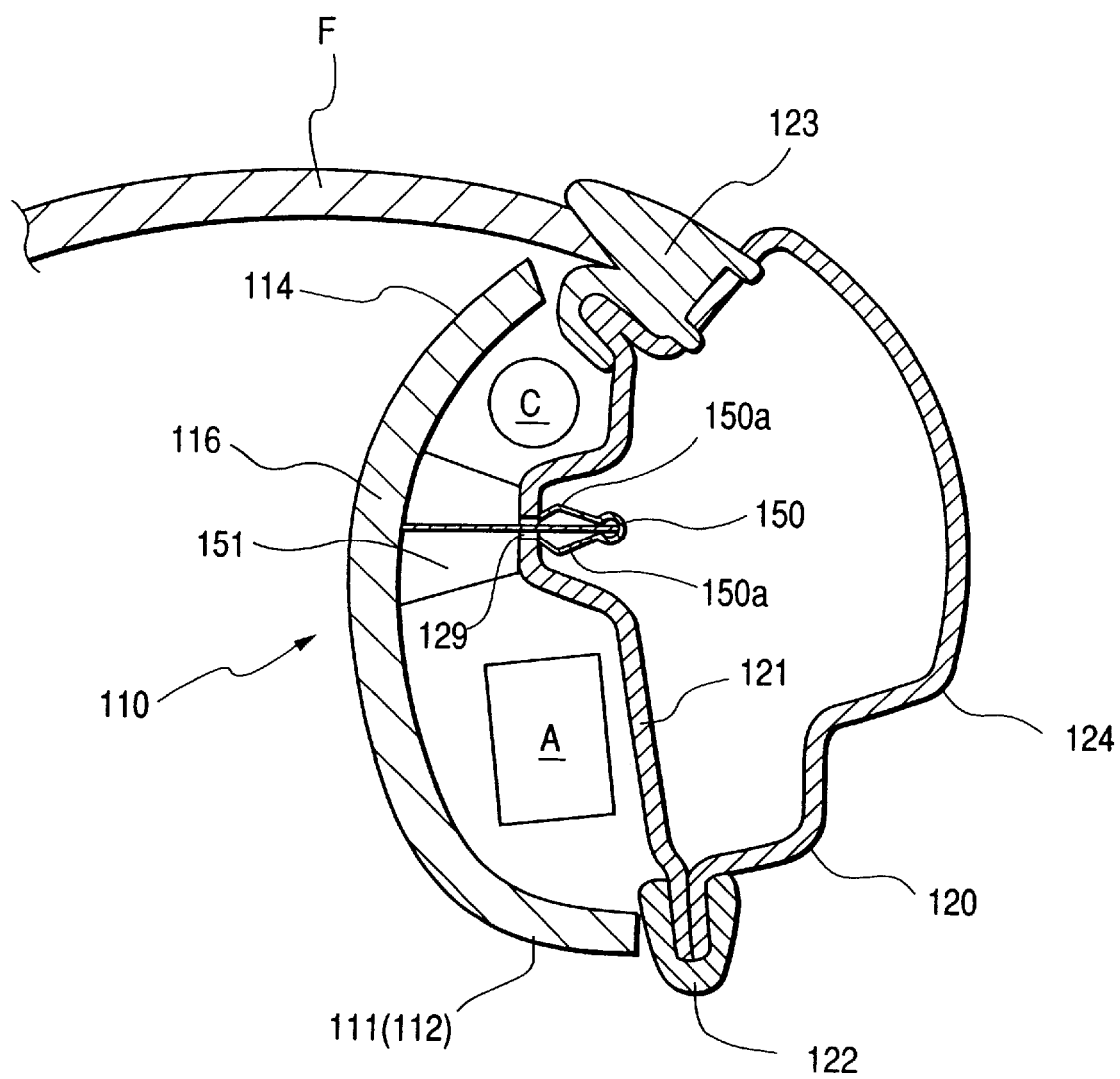
FIG. 13 is a cross sectional view taken along line 3—3 shown in FIG. 1.
Figure 14:
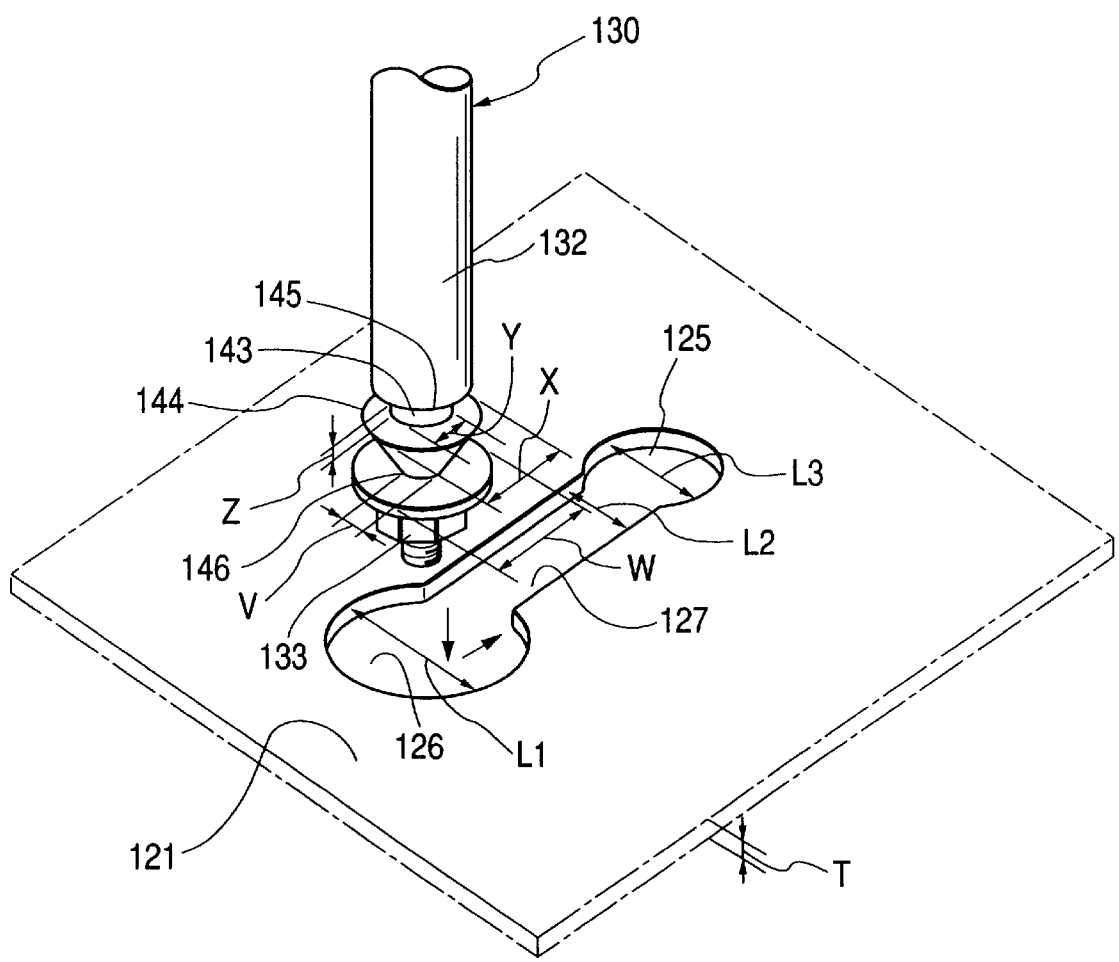
FIG. 14 is a partial and perspective view showing a state in which the pillar garnish is joined.
Figure 17:
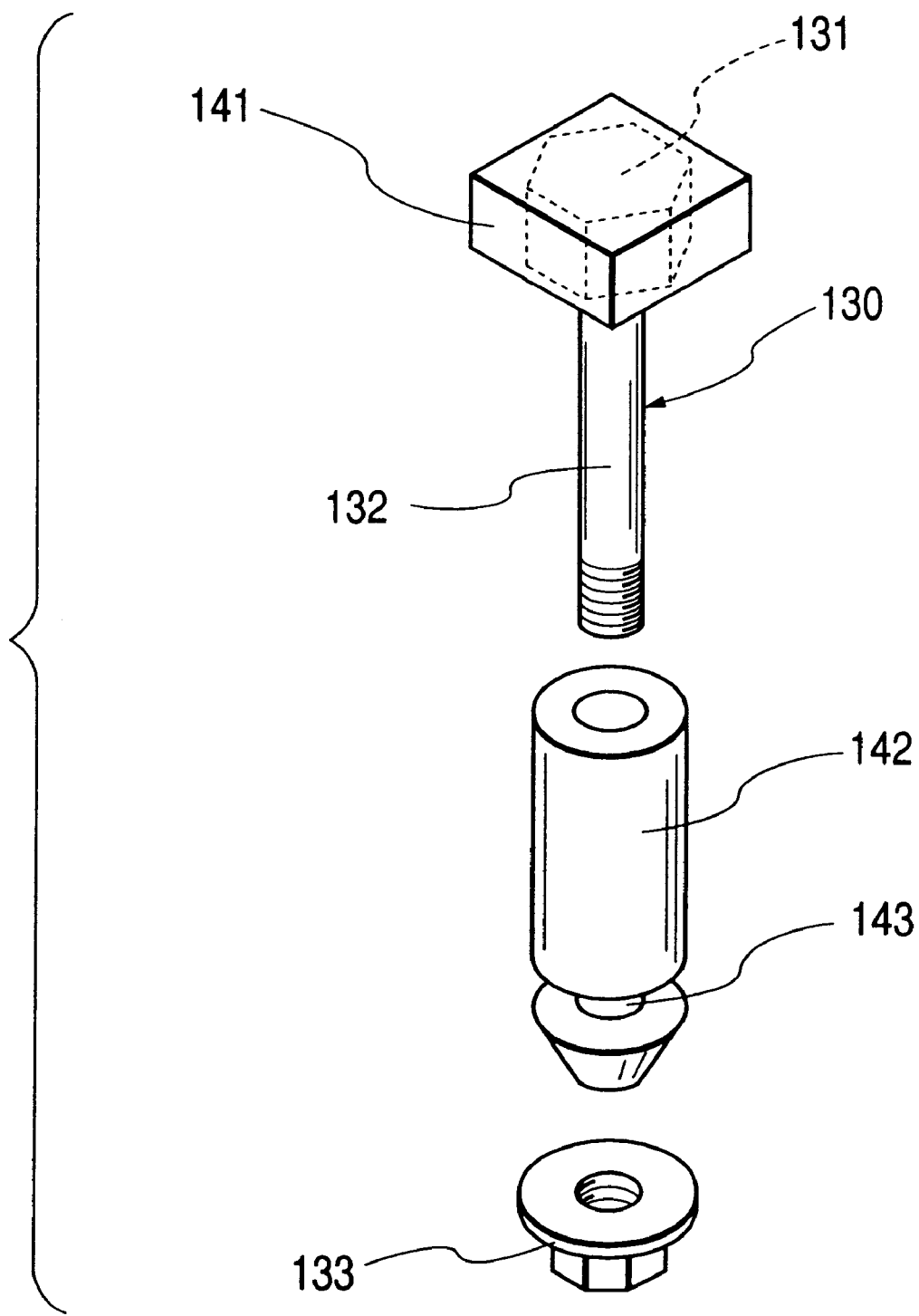
FIG. 17 is a perspective view showing another example of a covering member.
Figure 18:
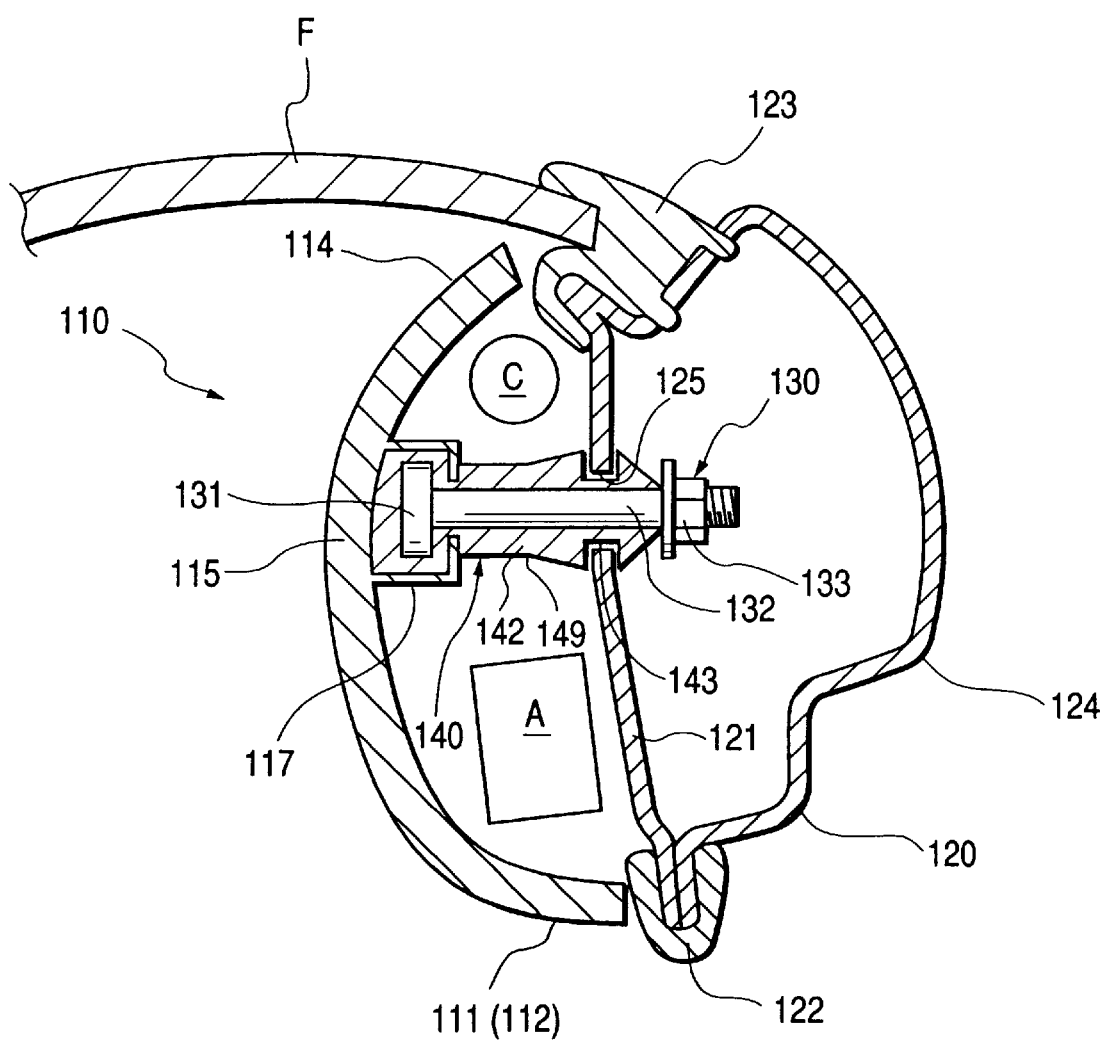
FIG. 18 is a cross sectional view showing another embodiment of the present invention.
Figure 19:
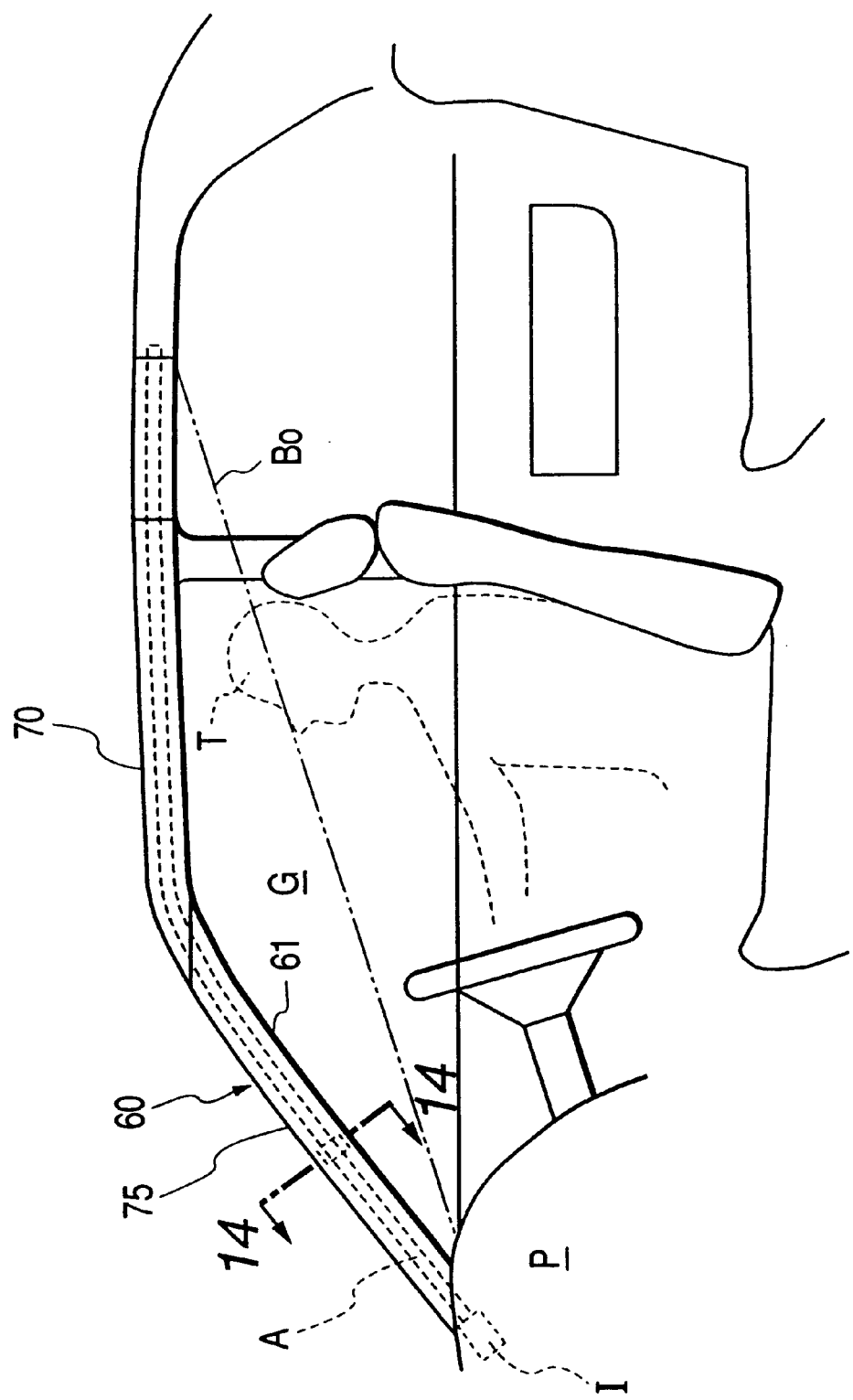
FIG. 19 is a schematic view showing the inside portion of a cabin to which a conventional a pillar garnish including an air bag has been joined.
Figure 20:
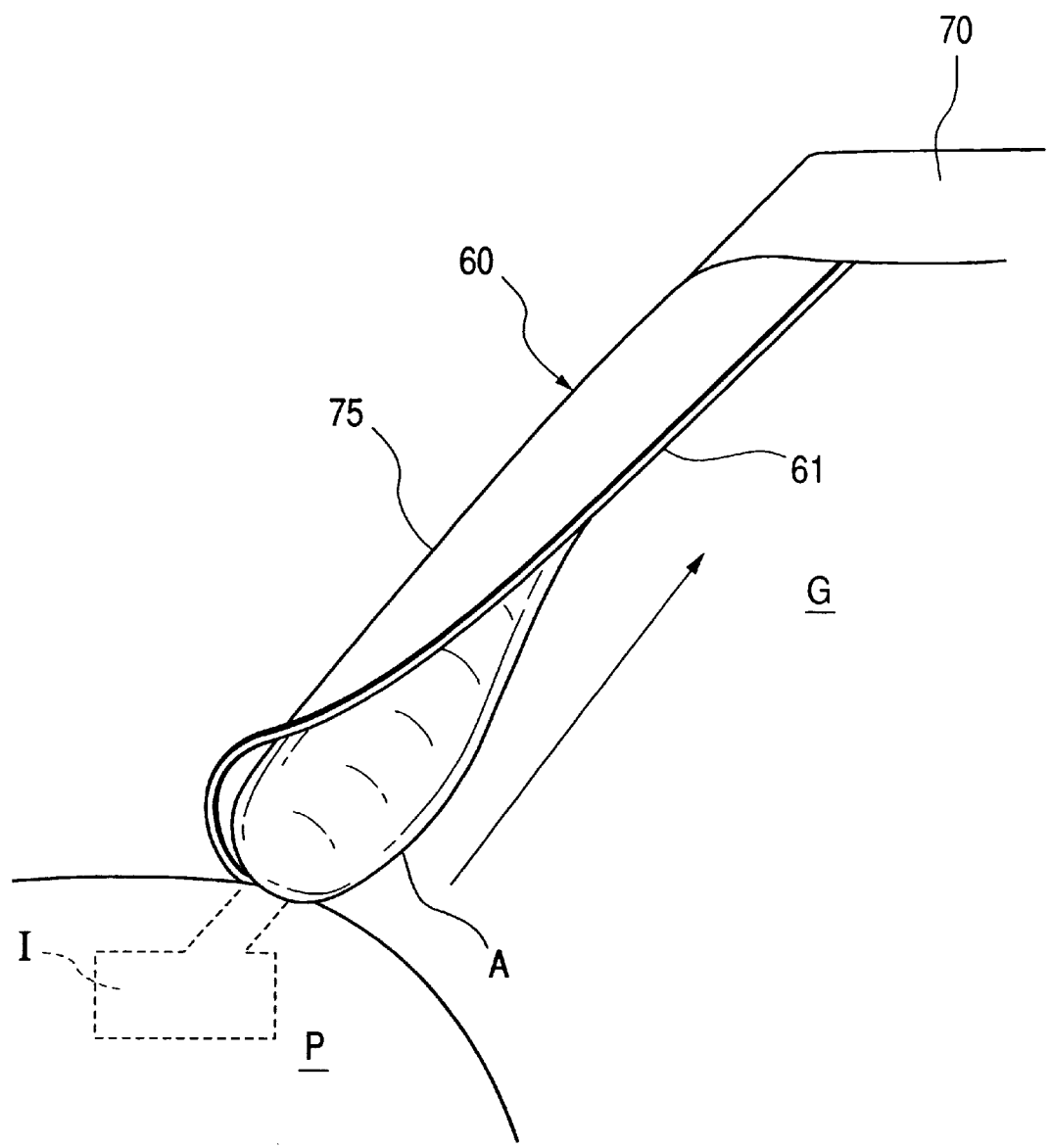
FIG. 20 is a schematic view showing a state in which an air bag has been expanded.
Figure 21:
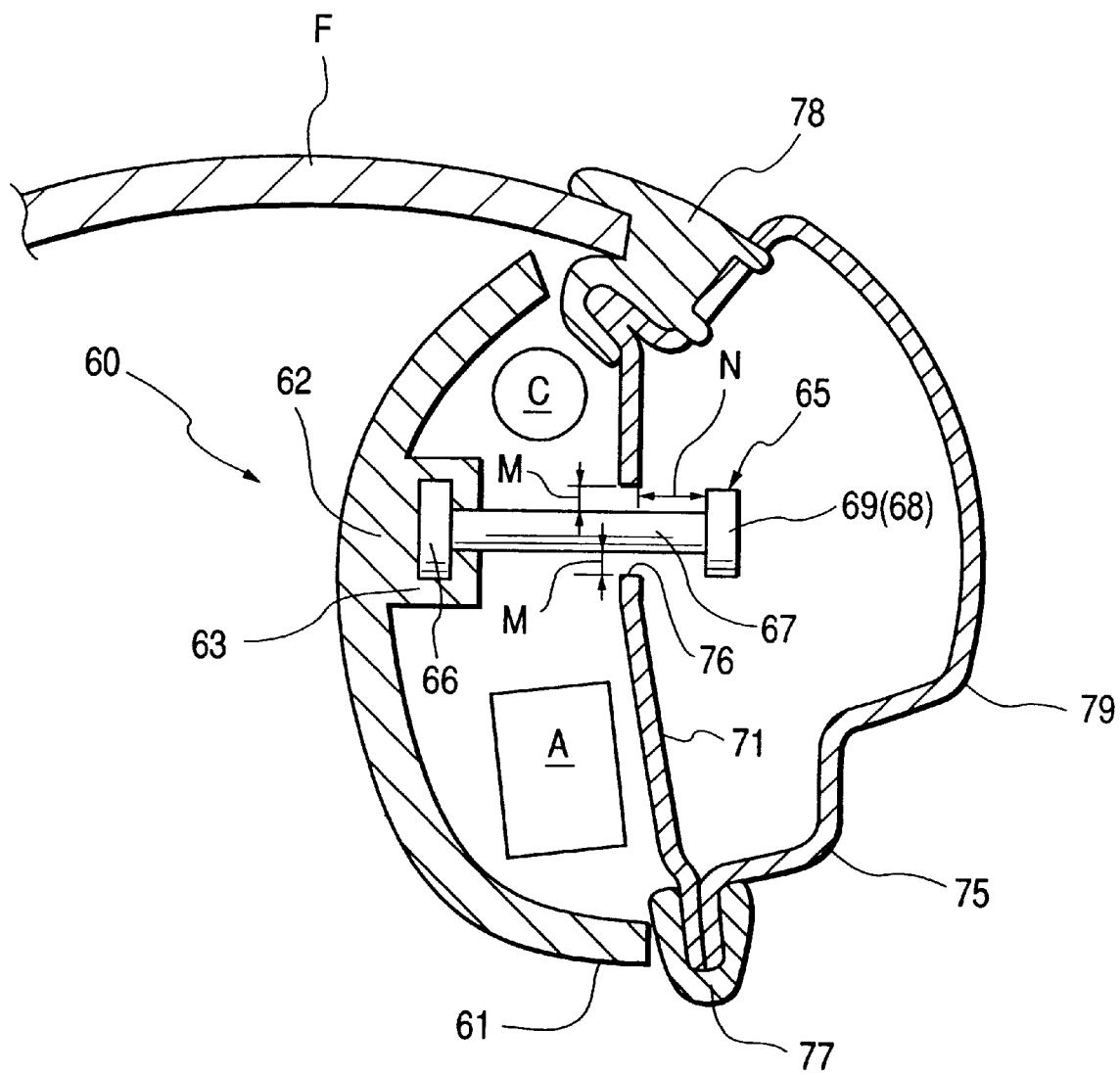
FIG. 21 is a cross sectional view taken along line 14—14 shown in FIG. 19.
Figure 22:
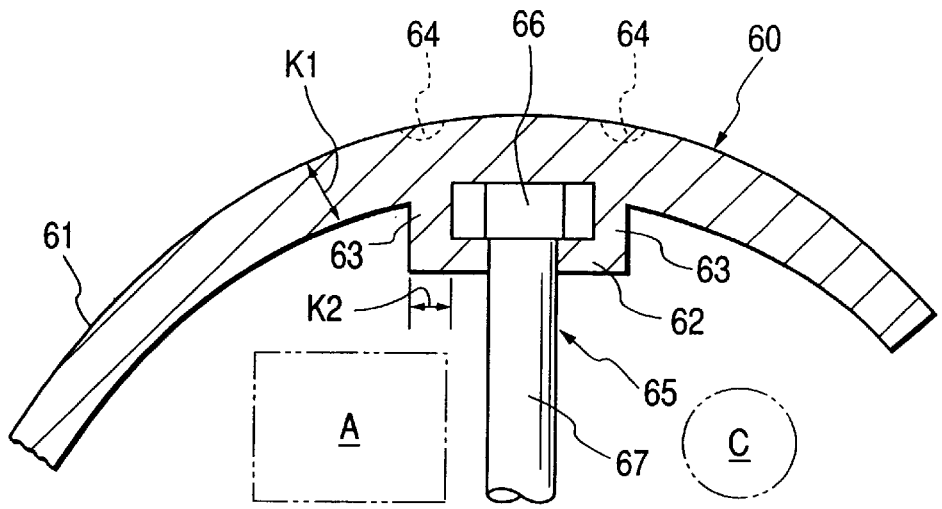
FIG. 22 is an enlarged cross sectional view showing a portion in the vicinity of the rod-shape fixing metal member shown in FIG. 21.
Figure 23:
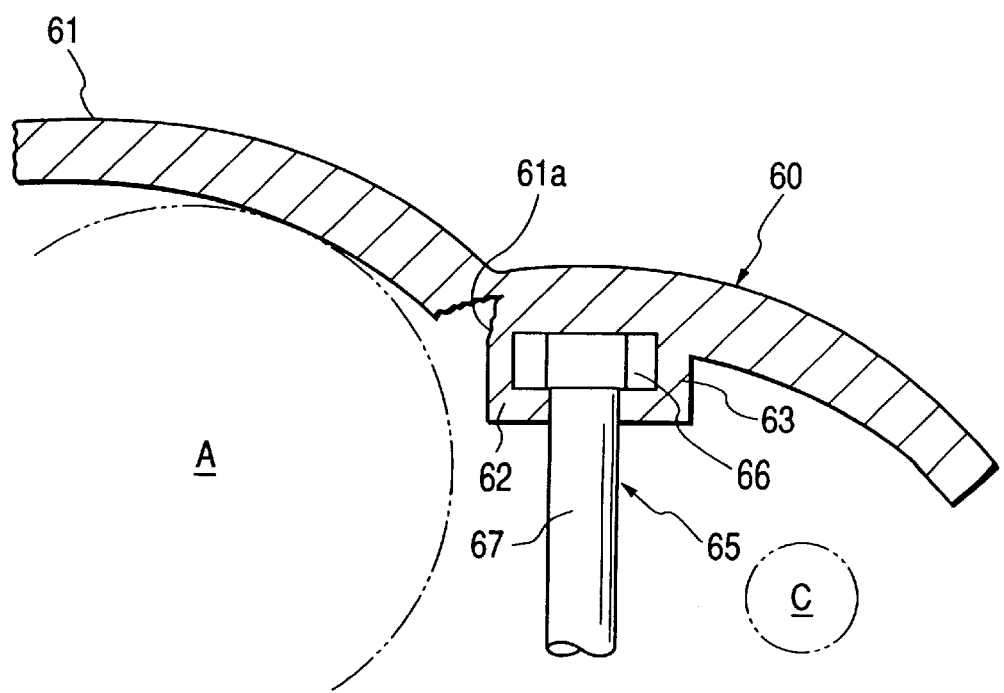
FIG. 23 is an enlarged cross sectional view showing the portion in the vicinity of the rod-shape fixing metal member when the air bag has been expanded and developed.

FIG. 12 is a cross sectional view taken along line 2—2 shown in FIG. 1. FIG. 13 is a cross sectional view taken along line 3—3 shown in FIG. 1. FIG. 14 is a partial and perspective view showing a state in which the pillar garnish is joined. FIG. 15 is a cross sectional view showing the pillar garnish when an air bag has been expanded. FIG. 16 is a graph of DSC. FIG. 17 is a perspective view showing another example of a covering member. FIG. 18 is a cross sectional view showing another embodiment of the present invention.

As shown in FIG. 12, the outer surface of the side portion of the shaft portion 132 of the rod-shape fixing metal member 130 is covered with a cylindrical covering member 140 made of adequate metal or resin. The outer surface of the covering member 140 of the shaft portion 132 is engaged and temporarily joined to an engaging hole 125 formed in the inner panel 121 of the pillar portion 120 of the car body. The temporary joining using the covering member 140 is suspended when the pillar garnish 110 is pressed in a direction toward the inside portion of the cabin owing to the expansion of the air bag A.

The covering member 140 according to this embodiment has a structure that a head covering portion 141 for covering the head 131 of the rod-shape fixing metal member 130 and a shaft covering portion 142 for covering the side surface of the shaft portion 132 of the rod-shape fixing metal member 130 are continuously formed. An engaging groove 143 arranged to be engaged to the engaging hole 125 of the pillar portion 120 of the car body is formed in the surface outer than the engaging portion 133 of the shaft covering portion 142. Also as shown in FIG. 14, the diameters of the outer end 144 of the engaging groove 143 adjacent to the engaging portion of the rod-shape fixing metal member and the outer end 145 adjacent to the head on the two sides of the engaging groove 143 are larger than the diameter of the engaging hole 125 of the pillar portion 120 of the car body. The outer end 144 of the engaging groove 143 adjacent to the engaging portion of the rod-shape fixing metal member has a diameter which is smaller than the diameter of the engaging portion 133 of the rod-shape fixing metal member 130. The covering member 140 is tapered in a direction from the outer end 144 of the engaging groove 143 adjacent to the engaging portion of the rod-shape fixing metal member toward the engaging portion 133 of the rod-shape fixing metal member 130. The outer diameters of the engaging portion 133 and a boundary portion 146 are smaller than the outer diameter of the engaging portion 133. In a case of a pillar garnish in a usual state, the distance from the engaging groove 143 of the covering member 140 and the engaging portion 133 corresponds to the distance from the engaging hole 125 of the pillar portion 120 of the car body to the engaging portion 133.

The reason why this embodiment has the structure that the region to the head 131 of the rod-shape fixing metal member 130 is covered with the covering member 140 will now be described. When the head 131 of the rod-shape fixing metal member 130 is insertion-molded in the seat portion 117 to injection-mold the pillar garnish 110, direct contact with the head portion of the rod-shape fixing metal member 130 is caused and, therefore, heat is deprived. In this case, ugly sink mark or the like occurs in the surface of the molded pillar garnish 110. Therefore, the foregoing problem must be prevented. In addition, propagation of a crack in a base portion 118 of the seat portion 117 when the pillar garnish 110 is pushed and bent must be prevented. It is preferable that the material of the covering member 140 capable of achieving the foregoing objects has compatibility with the resin of the pillar garnish 110 and the material can be welded to the resin of the pillar garnish 110. When the pillar garnish 110 is made of TPO, it is preferable that the covering member 140 is made of resin of the same type, that is, TPO.

To reliably prevent a crack of the base portion 118 of the seat portion 117, it is preferable that this embodiment has a structure that TPO for constituting the covering member 140 contains polypropylene by 40 wt % or more. Moreover, the relationship between peak area S1 indicating a heating value required to melt polypropylene and detected by DSC (Differential Scanning Calorie measurement) as shown in FIG. 16 and peak area S2 indicating a heating value required to melt a component which is melted at a temperature lower than the temperature at which polypropylene is melted must satisfy S2/S1<½. The component which is melted at temperatures lower than the temperature at which polypropylene is melted is exemplified by high-density PE (polyethylene), low-density PE, an ethylene-a olefine copolymer, a PE copolymer, such as an ethylene-acrylic acid copolymer, and a styrene polymer, such as a polymer, for example, SEBS (a styrene-ethylene-butene-styrene copolymer), which is melted at temperatures lower than the temperature at which polypropylene is melted.

It is furthermore preferable that the resin for constituting the covering member 140 according to this embodiment has an izod impact value (−30° C., JIS K 7110) which is greater than 4.5 kg·cm/cm. Moreover, the relationship between bending elastic modulus F1 of the resin which constitutes the covering member 140 and bending elastic modulus F2 (both of F1 and F2 are measured by a method conforming to ASTM D 790) which constitutes the pillar garnish 110 satisfies F1<F2. When the resin is selected, increase in the overall rigidity of the seat portion 117 can be prevented. Therefore, when the pillar garnish 110 is pressed owing to the expansion of the air bag A, the pillar garnish 110 can easily be bent in the vicinity of the seat portion 117. Thus, easy formation of a crack in the base portion 118 of the side surface 117a which serves as the hinge portion can be hard to propagate. It is preferable that range of the bending elastic modulus F1 of the resin which constitutes the covering member 140 satisfies 2000 kg/cm$^2$ to 7000 kg/cm$^2$ and the range of the bending elastic modulus F2 of the resin which constitutes the pillar garnish 110 satisfies 5000 kg/cm$^2$ to 10000 kg/cm$^2$.

The engaging hole 125 formed in the inner panel 121 of the pillar portion 120 of the car body and according to this embodiment is so structured as to be communicated with an insertion hole 126 through a communication insertion passage 127, as shown in FIG. 14. Each of the engaging hole 125 and the insertion hole 126 is in the form of a circular hole, while the communication insertion passage 127 is in the form of a straight-shape opening having a width L2 which is smaller than diameter L3 of the engaging hole 125 and diameter L1 of the insertion hole 126. The foregoing holes form a guitar-shaped opening formed in the vertical direction of the pillar portion 120 of the car body such that the engaging hole 125 is formed in the lower portion. An operation for joining the pillar garnish 110 will be described later.

The relationships among the engaging hole 125 and the like and the engaging groove 143 of the covering member 140 will now be described. It is preferable that (diameter L1 of the insertion hole 126)≧(outer diameter X of the outer end 144 of the engaging groove 143 adjacent to the engaging portion of the rod-shape fixing metal member)>(diameter L3 of the engaging hole 125)≧(inner diameter Y of the engaging groove 143)>(width L2 of the holes-connected passage 127). Moreover, it is preferable that (thickness T of the pillar portion 120 of the car body of the inner panel 121)<(width Z of the engaging groove 143)<3T. When the foregoing relationships are satisfied, the operation for securing the pillar garnish 110 to the pillar portion 120 of the car body to be described can be performed. That is, insertion of the rod-shape fixing metal member 130 into the insertion hole 126, upward movement in the holes connected passage 127 and engagement of the engaging groove 143 to the engaging hole 125 can easily be performed. Moreover, looseness occurring at the position of the rod-shape fixing metal member 130 can be prevented if the pillar garnish 110 is pressed from the inside portion of the cabin. Moreover, outer diameter V of the boundary portion 146 of the covering member 140 from the engaging portion 133 is determined as follows: (the outer diameter X of the outer end 144 of the engaging groove 143 adjacent to the engaging portion of the rod-shape fixing metal member)>(outer diameter V of the boundary portion 146)>(diameter L3 of the engaging hole 125) In the foregoing case, joining of the pillar garnish 110 to be described later can easily be performed.

The diameter L1 of the insertion hole 126, the diameter L3 of the engaging hole 125 and outer diameter W of the engaging portion 133 of the rod-shape fixing metal member 130 must satisfy (the diameter L1 of the insertion hole 126)≧(the outer diameter W of the engaging portion 133 of the rod-shape fixing metal member 130)>(the diameter L3 of the engaging hole 125). The difference between the outer diameter X of the outer end 144 of the engaging groove 143 adjacent to the engaging portion of the rod-shape fixing metal member and the diameter L3 of the engaging hole 125 is so determined as to cause the engaging groove 143 to exhibit the temporary joining action in a usual state. When the air bag A is expanded, the outer end 144 of the engaging groove 143 adjacent to the engaging portion of the rod-shape fixing metal member is able to forcibly pass through the engaging hole 125 owing to the pressure which is exerted to the pillar garnish 110 in a direction toward the inside portion of the cabin. In general, the difference is 0.5 mm to 2.5 mm, preferably 1.0 mm to 2.0 mm.

As shown in FIG. 13, the joint maintaining portion 116 for use in a usual state is engaged such that a known metal or resin clip 150 is secured to a seat portion 151 for the clip 150 provided for the reverse side of the pillar garnish 110. Moreover, the clip 150 is inserted into the clip hole 129 formed in the inner panel 121 of the pillar portion 120 of the car body. The clip 150 according to this embodiment has an engaging member 150a so bent as to be expanded outwards. When the pillar garnish 110 is joined to the pillar portion 120 of the car body, the pillar garnish 110 can be secured to the pillar portion 120 of the car body without any looseness. When the pillar garnish 110 is upwards pushed owing to the expansion of the air bag A, the clip 150 is separated from the clip hole 129 of the inner panel 121. The seat portion 151 for the clip 150 is constituted by ribs each having a small thickness to prevent sink mark in the designed surface of the pillar garnish 110.

An example of the operation for joining the pillar garnish 110 will now be described with reference to FIG. 14.

Initially, the engaging portion 133 of the rod-shape fixing metal member 130 is inserted into the insertion hole 126 of the pillar portion 120 of the car body. Thus, the insertion hole 126 is positioned in the vicinity of the boundary portion 146 between the engaging portion 133 and the covering member 140. Then, the pillar garnish 110 is upwards slid along the pillar portion 120 of the car body until the portion in the vicinity of the boundary portion 146 between the engaging portion 133 and the covering member 140 passes through the holes-connected passage 127 and collides with the engaging hole 125. Thus, the clip 150 of the joint maintaining portions 116 for use in a usual state is moved to a position above the clip hole 129 of the inner panel 121. Then, the pillar garnish 110 is, at the foregoing position, strongly pushed toward the inner panel 121 to insert and engage the clip 150 to the inside portion of the clip hole 129 Moreover, the rod-shape fixing metal member 130 is, together with the covering member 140, furthermore press-fit into the engaging hole 125. Thus, the engaging groove 143 and the engaging hole 125 are engaged to each other. As a result, joining of the pillar garnish 110 is completed The pillar garnish 110 is joined to the pillar portion 120 of the car body as described above. In a usual state, the engaging groove 143 of the covering member 140 and the engaging hole 125 of the inner panel 121 are engaged to each other, as shown in FIG. 12. Thus, the pillar garnish 110 can be held without any looseness. When the air bag A is expanded, the expansion of the air bag A causes the pillar garnish 110 to be pushed toward the inside portion of the cabin, as shown in FIG. 15. Simultaneously, also the rod-shape fixing metal member 130 is, together with the covering member 140, pulled in a direction toward the inside portion of the cabin. As a result, the outer end 144 of the engaging groove 143 adjacent to the engaging portion of the rod-shape fixing metal member of the covering member 140 forcibly passes through the engaging hole 125. Thus, the engagement between the engaging groove 143 and the engaging hole 125 is suspended. As a result, the rod-shape fixing metal member 130 and the covering member 140 are, together with the pillar garnish 110, slid into the inside portion of the cabin. The engaging portion 133 of the rod-shape fixing metal member 130 is brought into contact with the periphery of the engaging hole 125 of the inner panel 121 so that the engaging portion 133 is engaged to the same. As a result, separation of the pillar garnish 110 from the pillar portion 120 of the car body can be prevented. Moreover, the rear portion of the pillar garnish 110 is pushed and bent toward the inside portion of the cabin. The air bag A is developed in the inside portion of the cabin through the gap from the pillar portion 120 of the car body formed owing to pushing and bending.

The covering member 140 according to this embodiment is formed by integrally injection-molding the region to the head 131 of the rod-shape fixing metal member 130. The present invention is not limited to the foregoing structure. In case where the rod-shape fixing metal member consists of a bolt and a nut and also the head of the rod-shape fixing metal member is covered with resin, the shaft covering portion 142 for covering the outer surface of the shaft portion 132 may be individually molded from the head covering portion 141 for covering the head 131 of the rod-shape fixing metal member 130, for example, as shown in FIG. 17. The shaft covering portion 142 is joined to the shaft portion 132 of the rod-shape fixing metal member 130, and then the nut 133 is screwed to the shaft portion 132. In the foregoing case, change of only the shaft covering portion 142 is required when repair is performed. Thus, an economical effect can be obtained. Also the shape of the covering member is not limited to that according to this embodiment. For example, a restriction 149 may be formed in the outer surface of the covering member 140 in a region between the head 131 of the rod-shape fixing metal member 130 and the engaging groove 143 of the covering member 140, as shown in FIG. 18. Thus, the amount of required resin is reduced.

As illustrated and described above, the structure for joining a pillar garnish including an air bag according to the present invention is able to prevent separation of the pillar garnish when the air bag is expanded. Moreover, a covering process using a blind cover which is provided for a designed surface of the pillar garnish is not required. In addition, occurrence of sink mark can be prevented. Therefore, the appearance can be improved. Since a usual rod-shape fixing metal member can be employed, that is, a necessity of manufacturing a special member can be eliminated, an economical advantage can be realized.

The structure according to the present invention is able to increase the welding strength between the pillar garnish and the coating layer. Thus, separation between the pillar garnish and the coating layer which occurs when the air bag is expanded can be prevented. Therefore, a shock can effectively be absorbed to prevent a crack of the base portion of the side surface of the seat portion. When the reinforcing ribs are formed on the outside of the side surface of the seat portion, formation of a crack when the air bag is developed can furthermore reliably be prevented.

As described above, the structure for joining a pillar garnish including an air bag according to the present invention is able to prevent separation of the pillar garnish when the air bag is expanded. Moreover, noise produced owing to looseness and vibrations can be prevented. In addition, a usual rod-shape fixing metal member may be employed, that is, a necessity of manufacturing a special member can be eliminated. Therefore, enlargement of the cost can be prevented and a significant economical effect can be obtained.

What is claimed is:

1. A pillar unit comprising:
   a pillar garnish made of synthetic resin having a backside surface;
   a seat portion projecting from the backside surface of said pillar garnish, said seat portion defining a hollow portion;
   a pillar-member defining an engaging hole;
   a rod-shape fixing member having a head portion at one end thereof, an engaging portion at the other end thereof and a shaft portion between the head portion and the engaging portion, in which the head portion is larger in diameter than the shaft portion, the engaging portion is larger in diameter than the engaging hole and the head portion is disposed in the hollow portion;
   an airbag disposed between the backside surface of said pillar garnish and said pillar member; and
   a resin filling the hollow portion of said seat portion;
   wherein the engaging portion of said rod-shape fixing member penetrates through the engaging hole and is engaged with the engaging hole;
   wherein the hollow portion is filled with said resin in such a manner that a part of said pillar garnish corresponding to said seat portion is substantially uniform in thickness;
   wherein the synthetic resin, of which said pillar garnish is made, is a polyolefine-type thermoplastic elastomer;
   wherein said resin filled in the hollow portion is a polyolefine thermoplastic elastomer containing polypropylene by 40 wt % or greater and having the relationship between peak area S1 which indicates a heating value required to melt polypropylene and detected by differential scanning calorie measurement (DSC) and peak area S2 indicating a heating value required to melt a component which is melted at a temperature lower than the temperature at which polypropylene is melted, the relationship satisfying S2/S1<½; and wherein, when said pillar garnish is pushed and bent owing to the expansion of said airbag, the engagement of said covering member and the engaging hole results in preventing removal of said pillar garnish from said pillar member.

2. The pillar unit as claimed in claim 1, further comprising:

a plurality of reinforcing ribs radially formed on an outer side surface of said seat portion at least adjacent to a portion to which said air bag is developed.

3. A pillar unit comprising:

a pillar garnish made of synthetic resin having a backside surface;

a pillar member having an engaging hole;

a rod-shape fixing member having a head portion at one end of the rod-shape fixing member, an engaging portion at the other end of the rod-shape fixing member and a shaft portion between the head portion and the engaging portion, in which the head portion is fixed to said pillar garnish and the engaging portion is larger in diameter than the engaging hole;

an airbag disposed between the backside surface of said pillar garnish and said pillar member; and a covering member covering the shaft portion of the rod-shape fixing member to be engaged with and temporarily secured to the engaging hole of said pillar member, wherein, when said pillar garnish is pushed and bent owing to the expansion of said air bag, the engagement of said covering member and the engaging hole is suspended, so that the engaging hole and the engaging portion of said rod-shape fixing member are engaged with each other.

4. The pillar unit as claimed in claim 3, wherein the covering member defines an engaging groove, for engaging with the engaging hole to temporarily secure the engaging hole, in an outer surface of said covering member of said rod-shape fixing member, and an outer diameter of a leading end of said covering member adjacent to said engaging portion of said rod-shape fixing member is smaller than the outer diameter of the engaging portion of said rod-shape fixing member.

5. The pillar unit as claimed in claim 4, wherein said pillar member includes an inner panel that defines said engaging hole, said inner panel further having a communication insertion passage and an insertion hole communicated with said engaging hole through said communication insertion passage, and the following relationship is held:

(diameter L1 of said insertion hole)≧(outer diameter X of an outer end of said engaging groove adjacent to said engaging portion of said rod-shape fixing member)> (diameter L3 of said engaging hole)≧(inner diameter Y of said engaging groove)>(width L2 of said communication insertion passage), and (thickness T of said inner panel)<(width Z of said engaging groove)<3T.

6. The pillar unit as claimed in claim 3, wherein said covering member is made of resin.

7. The pillar unit as claimed in claim 6, further comprising:

a seat portion projecting from the backside surface of said pillar garnish, said seat portion defining a hollow portion;

wherein the head portion of said rod-shape fixing member is larger in diameter than the shaft portion, wherein the head portion of said rod-shape fixing member is disposed in the hollow portion, wherein the hollow portion is filled with said resin.

8. A pillar unit comprising:

a pillar garnish made of synthetic resin having a backside surface;

a seat portion projecting from the backside surface of said pillar garnish, said seat portion defining a hollow portion;

a pillar member defining an engaging hole;

a rod-shape fixing member having a head potion at one end thereof, an engaging portion at the other end thereof and a shaft portion between the head portion and the engaging portion, in which a cross section of the head portion taken along a direction perpendicular to an axial direction of the fixing member has a maximum dimension that is larger than a maximum dimension of a cross section of the shaft portion taken in the same direction, a cross section of the engaging portion taken along the direction perpendicular to the axial direction of the fixing member has a maximum dimension that is larger than the a maximum dimension of the engaging hole, and the head portion is disposed in the hollow portion;

an airbag disposed between the backside surface of said pillar garnish and said pillar member; and a resin filling the hollow portion of said seat portion;

wherein the engaging portion of said rod shape fixing member is disposed on an opposite side of said engaging hole to said head portion and is adapted to engage with said engaging hole;

wherein the hollow portion is filled with said resin in such a manner that said resin conforms to a shape of backside surface of said pillar garnish where said resin interfaces with said backside surface of said pillar garnish; and wherein said pillar garnish is pushed and bent owing to an expansion of said airbag, the engagement of said covering member and the engaging hole results in preventing removal of said pillar garnish from said pillar member.

9. The pillar unit according to claim 8, wherein said resin surrounds said head portion of said rod-shape fixing member.

10. The pillar unit according to claim 8, wherein said resin contains polypropylene and at least one other component, said at least one other component having a melting temperature that is lower than that of said polypropylene; and wherein a relationship between peak area S1 that indicates a heating value required to melt polypropylene and detected by scanning calorie measurement (DSC) and peak area S2 indicating a heating value required to melt said at least one other component satisfies the relationship that S2/S1 is approximately less than ½.

11. The pillar unit according to claim 8, wherein a bending elastic modulus of said resin is less than a bending elastic modulus of said pillar garnish.

* * * * *